US012677965B2

(12) United States Patent
Waalkes et al.

(10) Patent No.: US 12,677,965 B2
(45) Date of Patent: Jul. 14, 2026

(54) SECURITY CASE

(71) Applicant: VIRA Insight, LLC, Lewisville, TX (US)

(72) Inventors: James Waalkes, Grand Rapids, MI (US); Benjamin J. Sahlberg, Grand Rapids, MI (US); Jerry W. Norcross, Caledonia, MI (US)

(73) Assignee: VIRA Insight, LLC, Lewisville, TX (US)

( * ) Notice: Subject to any disclaimer, the term of this patent is extended or adjusted under 35 U.S.C. 154(b) by 235 days.

(21) Appl. No.: 18/649,226

(22) Filed: Apr. 29, 2024

(65) Prior Publication Data

US 2025/0331661 A1 Oct. 30, 2025

(51) Int. Cl.

| | |
|---|---|
| ***A47F 3/00*** | (2006.01) |
| ***A47F 3/06*** | (2006.01) |
| ***E05D 15/06*** | (2006.01) |

(52) U.S. Cl.

CPC .............. *A47F 3/002* (2013.01); *A47F 3/005* (2013.01); *A47F 3/06* (2013.01); *E05D 15/0621* (2013.01)

(58) Field of Classification Search

CPC .......... A47F 3/002; A47F 3/004; A47F 3/005; A47F 3/06; E05D 15/0621; E05Y 2900/202

USPC .................................. 312/138.1, 139.2, 205

See application file for complete search history.

(56) References Cited

U.S. PATENT DOCUMENTS

| | | | | | |
|---|---|---|---|---|---|
| 1,120,955 | A * | 12/1914 | Martin | B65D 5/0005 | 229/101 |
| 1,782,819 | A * | 11/1930 | Hansen | A47F 3/125 | 312/139.2 |
| 2,753,236 | A * | 7/1956 | Spring | E06B 3/4663 | 312/139.2 |
| 2,965,243 | A * | 12/1960 | Mapson | A47B 47/021 | 211/183 |
| 4,025,137 | A * | 5/1977 | Wyler | A47B 45/00 | 248/172 |
| 4,148,535 | A * | 4/1979 | Fenwick | A47B 47/04 | 312/265.5 |
| 4,274,687 | A * | 6/1981 | Bayles | A47B 91/00 | 248/188.7 |
| 4,618,193 | A * | 10/1986 | Cuthbert | D06F 39/12 | 312/265.5 |
| 5,472,082 | A * | 12/1995 | Thiele | A45C 7/0031 | 190/22 |
| 5,524,977 | A * | 6/1996 | Orawski | A47F 3/005 | 312/265.5 |
| 10,448,755 | B1 * | 10/2019 | McDowell | A47F 5/103 | |
| 10,646,058 | B2 | 5/2020 | Jones | | |
| 10,736,438 | B1 * | 8/2020 | Jhaveri | A47B 47/00 | |
| 11,510,506 | B1 | 11/2022 | Farinola | | |

(Continued)

*Primary Examiner* — James O Hansen

(74) *Attorney, Agent, or Firm* — Warner Norcross + Judd LLP

(57) ABSTRACT

A security case to protect theft prone products in a retail establishment is provided. The security case can include at least one of an adjustable depth system of telescoping panels to accommodate different depth shelves, a moveable reinforced transparent closure and/or a toe kick levelling system securable to a base of a sales rack or gondola to enable the security case and its components to level to a horizontal plane. These systems and others can be singular or combined with one another in any manner and number.

17 Claims, 20 Drawing Sheets

(56) References Cited

U.S. PATENT DOCUMENTS

| | | | |
|---|---|---|---|
| 11,647,850 | B2 | 5/2023 | Farinola et al. |
| 2007/0236111 | A1 | 10/2007 | Gray |
| 2021/0361083 | A1* | 11/2021 | Guyette .................... A47F 5/10 |

* cited by examiner

SECURITY CASE

BACKGROUND OF THE INVENTION

The present invention relates to security cases employed in point-of-sale merchandising.

In self-service retail establishments, such as box stores, cosmetic stores, drug stores, grocery stores and the like, products typically are displayed for sale on racks including vertically spaced shelves on or over which the products are placed, arranged in stacks and/or hung. In some instances, the products may be of relatively high value and/or be of a small size. Such products might include cosmetics, beauty products, jewelry, electronics, razor blades, pharmaceuticals, liquor and the like. With these types of products, theft can be a prevalent issue. Accordingly, many retail stores utilize security cases to safeguard these theft prone products.

To ease in installation and avoid disruption of retail space layout and flow, many security cases are designed to interface with and be installed relative to existing or common sales racks, sometimes referred to as gondolas. Such security cases usually enclose one or more shelves that support or display theft prone products, generally protecting those products from access and removal by customers without the assistance of a sales representative of the retail store. A common security case includes rigid sidewalls that attach to a vertical upright wall or pegboard of an already installed retail sales rack or gondola, a top wall or cover connecting and spanning between the rigid sidewalls, and one or more transparent sliding panels, typically constructed of tempered glass, that are disposed forward of shelves on the sales rack to provide consumers with the opportunity to view and locate a particular product. The transparent panels are locked with a lock so that a customer must have a sales representative or store clerk unlock a panel to provide access to the inside of the security case and thus the products desired by the customer. After the customer decides to purchase the product or cease reviewing it, the clerk can relock the panel and secure again the products inside the case.

While conventional security cases can be installed somewhat easily on sales racks, and do secure theft prone products to some extent, they suffer some shortcomings. For example, while transparent tempered glass panels offer theft protection under usual shopping settings, they are easily breached in others. During flash mobs or robs, looters typically have the opportunity to forcibly engage and beat on such glass panels. As a result, the glass panels usually break so that the looters can breach the security case through the panels and remove the theft prone products.

As another example, many conventional security cases require a custom build and precise dimensions to fit specific sales racks already installed in a retail environment. Frequently, the depth of shelves from an aisle to the pegboard will be of a set depth. Accordingly, the sidewalls and top wall of a security case installed relative to the sales rack need to be custom built to fit around the shelves and accommodate the set depth of the sales rack installed in the retail store. This can require extra sets of sidewalls and other walls being on hand and in various sizes to fit the particular depth of the shelves, increasing inventory of such sidewalls and making installation of cases more complex and time consuming.

As yet another example, existing sales racks or gondolas in a retail store can be poorly installed or installed on an uneven floor. As a result, the gondolas might not be level to horizontal. Thus, when a typical security case and its walls and panels are mounted to an unlevel gondola or portion of the gondola, the components of the security case also will not be level. This can result in the security case or its components appearing misplaced or aesthetically crooked. This can be particularly problematic where a transparent access panel in front of the shelves is unlevel, which condition is easily viewed by consumers and retail staff, resulting in a poor impression of quality of the security case within the retail store. Further, where the transparent access panels swing or slide, the unlevel condition can hamper opening or closing the panels.

Accordingly, there remains room for improvement in the field of security cases, and in particular the construction of transparent access panels, the adjustability of walls of the cases and/or the ability to level all or a portion of the security case even where a sales rack to which it is mounted is unlevel.

SUMMARY OF THE INVENTION

A security case to protect theft prone products in a retail establishment is provided. The security case can include at least one of an adjustable depth system of telescoping panels to accommodate different depth shelves, a moveable reinforced transparent closure, and/or a toe kick levelling system securable to a base of a sales rack or gondola to enable the security case and its components to level relative to a horizontal plane.

In one embodiment, the security case can include an adjustable depth system of panels to accommodate shelves of a sales rack or gondola that may have varying depths. The panels can include a first side panel and a second side panel that are telescopingly joined with one another so that a depth of a front edge of the panels to a rear edge of the panels can be selectively adjusted to accommodate a shelf depth of a shelf extending from an upright of the gondola or sales rack to which the security case is mounted.

In another embodiment, the adjustable depth system of the security case can include the first side panel and the second side panel, each including a respective upper edge, lower edge, front edge and rear edge. The first side panel can define a plurality of first slots disposed downward from the upper edge of the first side panel. The first slots can be vertically oriented and parallel to one another and disposed downward from the upper edge, but transverse to the first upper edge, and oriented parallel to a front edge and a rear edge of the first side panel.

In still another embodiment, the adjustable depth system of the security case can include a second side panel disposed adjacent the first side panel such that the first side panel and the second side panel bound an internal compartment of the security case. The second side panel can be selectively movable such that a distance between the first rear edge and the second rear edge is selectively adjustable in a telescoping manner. The second side panel can define a second slot being selectively alignable with a first slot of the plurality of first slots, at least one of the first side panel and second side panel configured to join with a gondola upright of a gondola. The system can include a first fastener positionable through the first slot and the second slot to fix the first depth of the first rear edge to the second front edge to accommodate the first shelf depth of a first shelf extending from the gondola upright.

In yet another embodiment, the adjustable depth system of the security case can be configured so the first fastener can be selectively repositionable through another of the plurality of first slots to fix a different depth of the first rear edge to the second front edge and thereby accommodate a second shelf depth different from the first shelf depth and so on.

In even another embodiment, the adjustable depth system can include a top panel including an upper interior panel and an upper exterior panel telescopingly arranged relative to one another to accommodate the first depth of the first shelf.

In a further embodiment, the adjustable depth system of the security case can include a third panel including a third upper edge and a fourth panel including a fourth upper edge, the third panel and the fourth panel bounding an opposite side of the internal compartment from the first side panel and the second side panel, the third panel and the fourth side panel joined in a telescoping manner with one another and joined with the gondola upright. The upper interior panel and the upper exterior panel of the top panel can be unattached to the gondola upright, but can be fixedly attached to the respective first upper edge, the second upper edge, the third upper edge and the fourth upper edge, for example, via fasteners secured in a fixed and secure manner.

In still a further embodiment, the reinforced transparent closure of the security case can include a polymeric transparent panel disposed in a door track forward of the internal compartment so a viewer can view through the transparent panel to the first shelf. The polymeric transparent panel can be moveably joined with the door track. The polymeric transparent panel optionally can be constructed from a thermoplastic polymer containing carbonates, and further optionally in the form of a polycarbonate panel or sheet.

In yet a further embodiment, the reinforced transparent closure can include the transparent panel which can be reinforced along a lateral edge with one or more channel members that extend adjacent one or both opposing lateral edges of the panel. Multiple holes can be defined through the channel members and along the lateral edges of the transparent panel, optionally with no holes defined along the upper and lower edges of the panel. Multiple fasteners can extend through the multiple holes defined through the lateral edge and the channel member to secure the channel member to the lateral edge. These fasteners can be in the form of threaded bolts, screws, pins, dowels, bars or other elongated elements.

In even a further embodiment, the channel member of the transparent panel of the reinforced transparent closure can include a first channel wall, a second channel wall and a connecting wall that form a U shape. The transparent panel can include an exterior surface and an interior surface which faces the internal compartment. The first channel wall can face toward the exterior surface, optionally contacting it, and the second channel wall can face toward the interior surface, optionally contacting it. The fastener can extend through aligned holes in the first and second channel walls, as well as a hole through the transparent panel. The fastener can be tightened to engage one or more walls against the exterior and/or interior surface and secure the member to the edge.

In another embodiment, the reinforced transparent closure can include two or more sliding transparent panels of the type described above. The transparent panels can each be reinforced along lateral edges thereof. Where the lateral edges overlap, the channel members can include angled flanges that interlock with one another to prevent the lateral edges and panels themselves from being pried apart and/or to tie the channel members of adjacent doors together to prevent the closure from being bent-in under force to breach the security case.

In still another embodiment, the toe kick levelling system of the security case can include a toe kick including a toe kick lower edge, a first adjustment support including a first foot, the first adjustment support joined with the toe kick; and a second adjustment support including a second foot. The first adjustment support and second adjustment support can be joined with the toe kick distal from one another. The adjustment supports can be selectively adjustable to level the toe kick lower edge relative to a horizontal plane, regardless of the level of a sales rack or gondola to which the security case is joined. Where the toe kick is further joined with a door track, that door track can be leveled relative to the horizontal plane via the level adjustment of the toe kick.

In yet another embodiment, the toe kick levelling system of the security case can be configured to extend beyond a gondola, its shelves and a base of the gondola to position a door track and associate transparent doors forward of the shelves without reducing storage space of those shelves in the security case.

In even another embodiment, the toe kick levelling system can be constructed so that the first adjustment support can include a first threaded aperture and a first threaded shaft therein, the first threaded shaft joined with a first foot, the first adjustment support joined with the toe kick. The second adjustment support can include a second threaded aperture and a second threaded shaft therein, the second threaded shaft joined with a second foot. The first foot and second foot can be independently adjustable in length, extending below or adjacent the toe kick lower edge to selectively level or adjust the level of the lower edge and the toe kick itself.

In a further embodiment, the security case can include a door track forward of the internal compartment. The door track can include an upwardly opening track channel, and a support block disposed in the track channel and separating the track channel into a front door track and a rear door track. The support block can define multiple pin apertures, with multiple pins disposed through respective ones of the pin apertures. Roller bearings can be mounted to respective ones of the pins, such that a first roller bearing is rotatably disposed in the front door track on a front side of the support block and a second roller is rotatably disposed in the rear forward door track on a rear side of the support block. These roller bearings can be configured to support at least one closure, such as a door or panel herein, on the bearings in a rolling or moving manner.

In another further embodiment, the adjustable depth system, moveable reinforced transparent closure and toe kick levelling system can be used singularly or in any combination in the security case to provide the structural, functional and/or operational benefits of these components. In certain applications, any one of the above systems and components can be included or absent from the security case.

The current embodiments provide a security case that has improved efficiencies and structural and functional advantages over prior cases. Where the adjustable depth system is included, the panels and closure thereof can be easily and quickly adjusted to accommodate a variety of different shelf depths. On an installation job, this can reduce the number of different components that are brought to the install the security case. This also can reduce the inventory of parts and components used to build security cases. Where the moveable reinforced transparent closure is included, the transparent panels are well fortified to withstand substantial forces and reduce the likelihood of breach of the security case and thus removal of theft prone products stored in the security case. The transparent panels still provide easy viewing and access to the internal compartment of the security case. Where a modified door track and channel system is included, the transparent panels can glide and slide open easily and effortlessly. Where the toe kick levelling system is included, a security case and its components can be installed level to horizontal despite an uneven floor under the sales rack or gondola, and despite cases where the base and other parts of the gondola are uneven, unlevel or in questionable condition. The toe kick levelling system also can provide its own, independent support to the door track which can provide enhanced and seamless function, as well as preserving shelf space on the shelves of the pre-existing gondola on which the case is installed.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
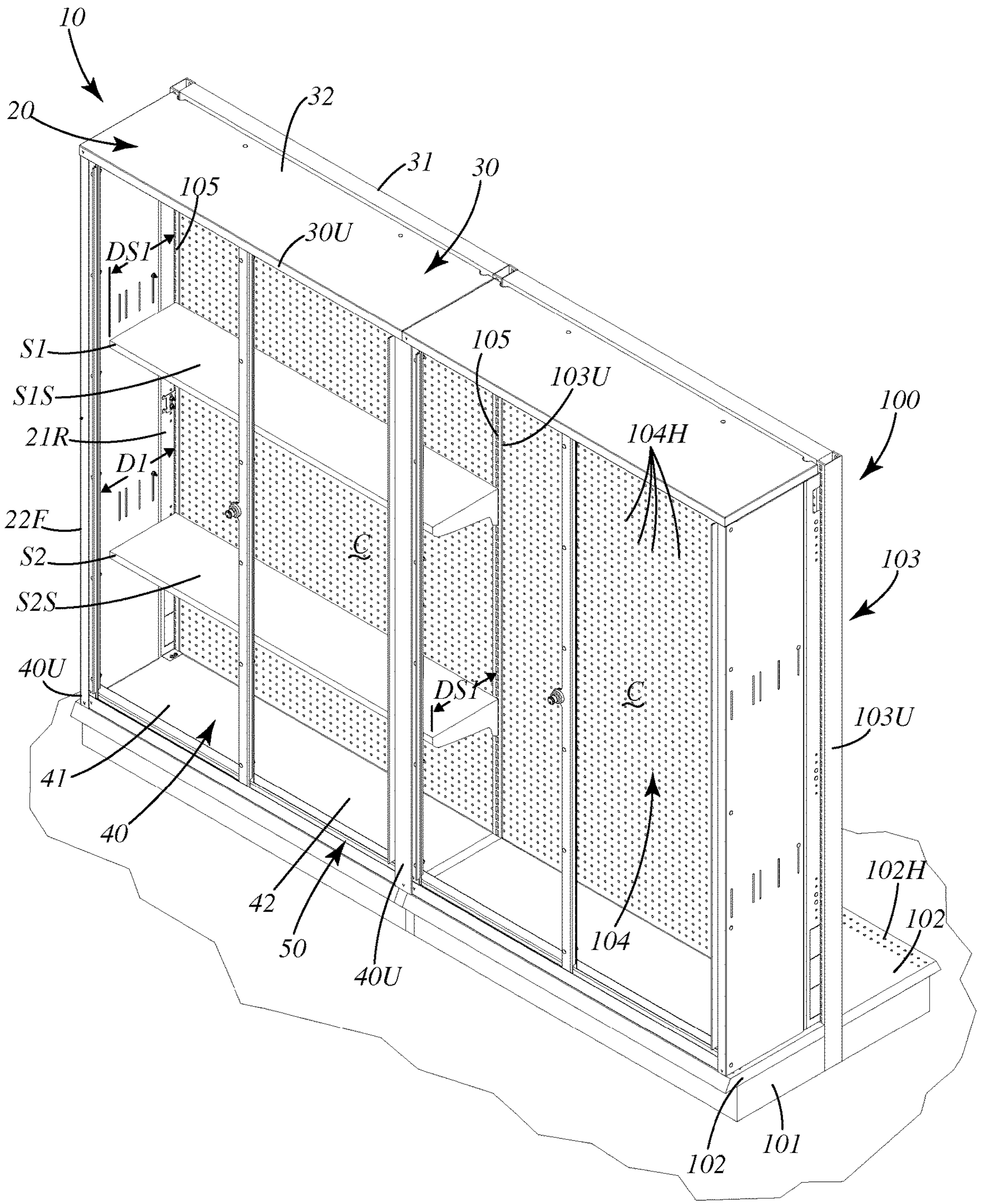
FIG. 1 is a perspective view of the security case of a current embodiment.
Figure 2:
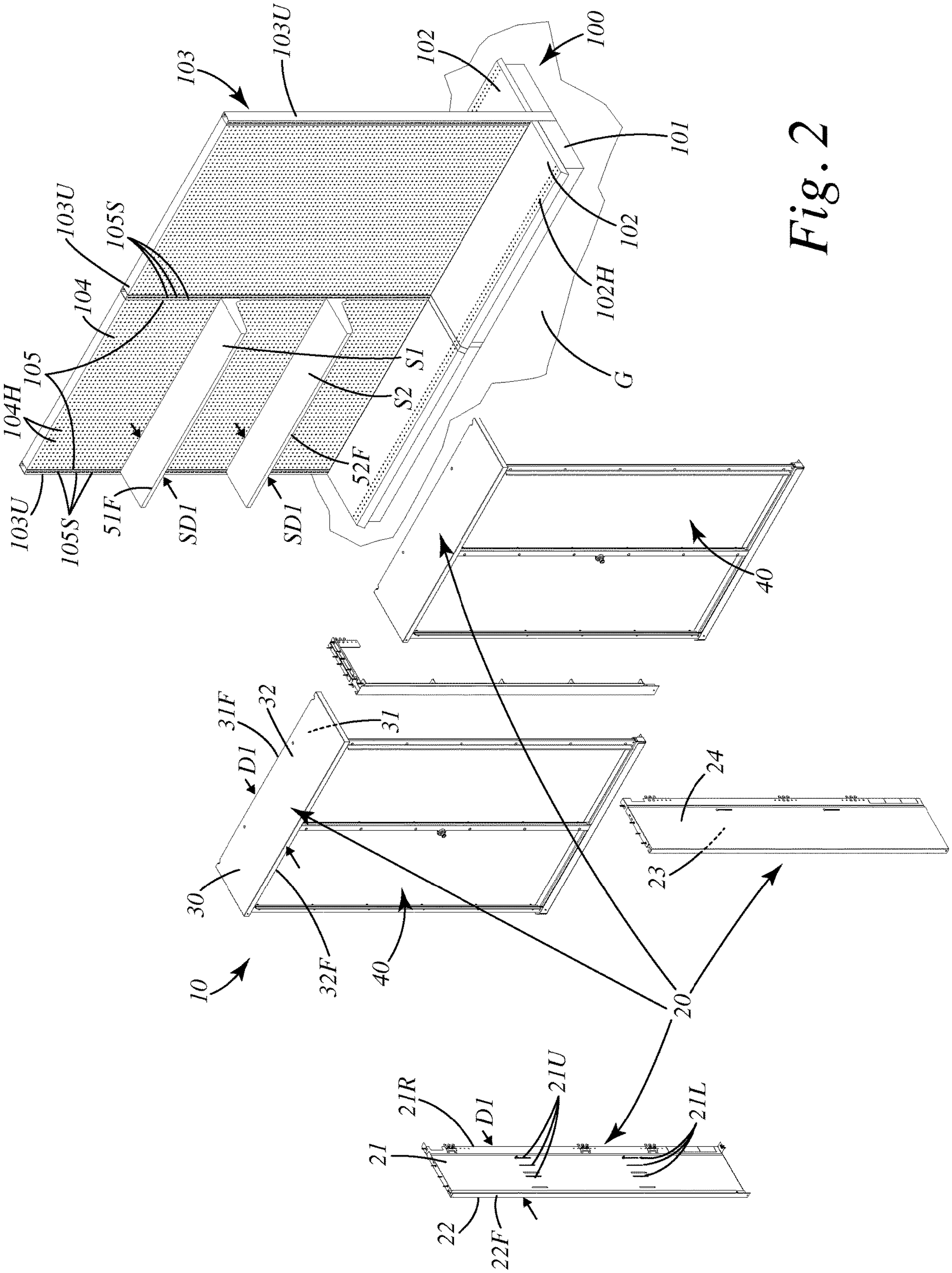
FIG. 2 is an exploded perspective view of the security case illustrating a gondola to which the case is secured, with the adjustable depth system and moveable reinforced transparent closure exploded.
Figure 3:
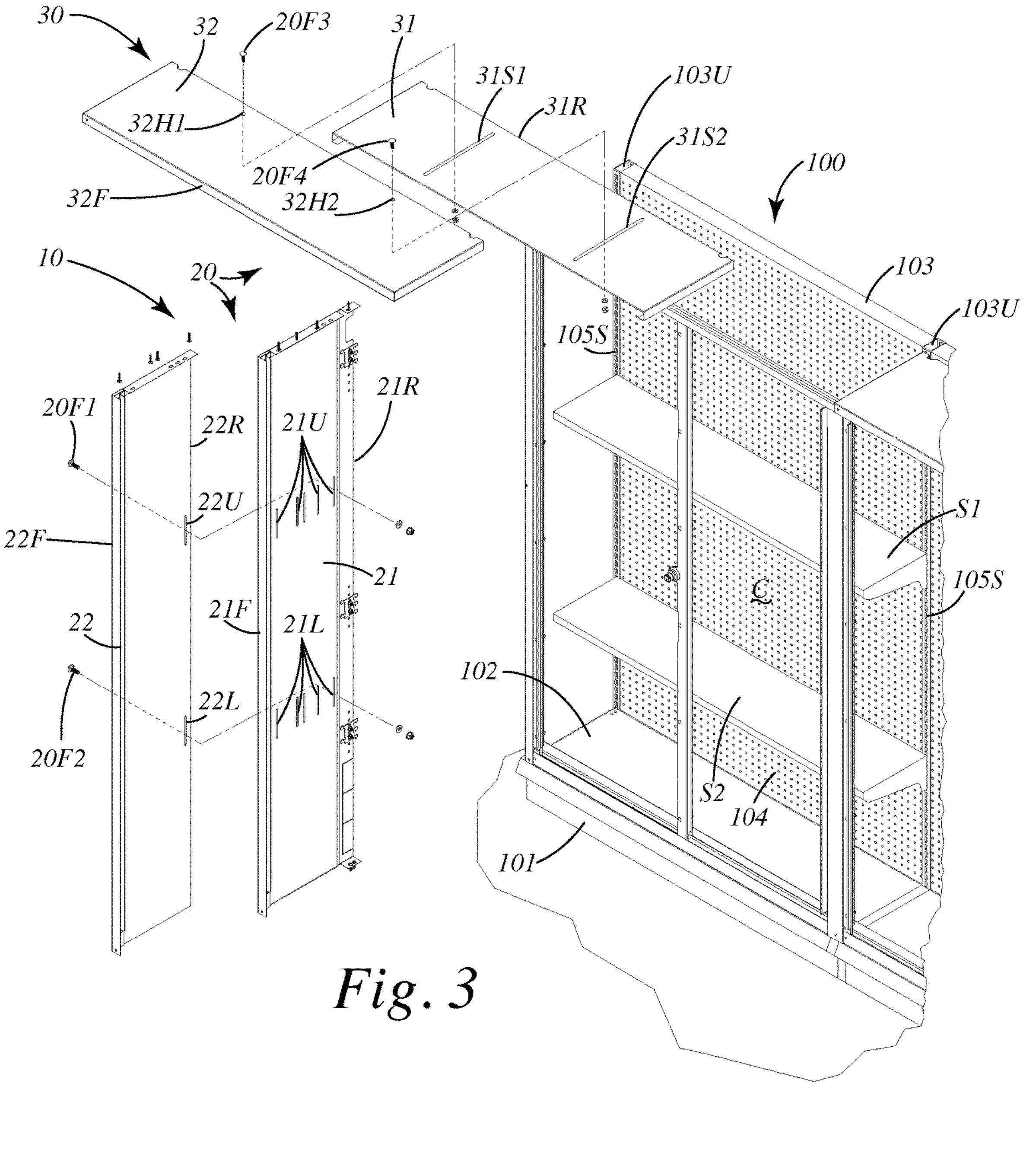
FIG. 3 is an exploded perspective view of the security case illustrating first and second adjustable side panels and a first and second adjustable top panels.
Figure 4:
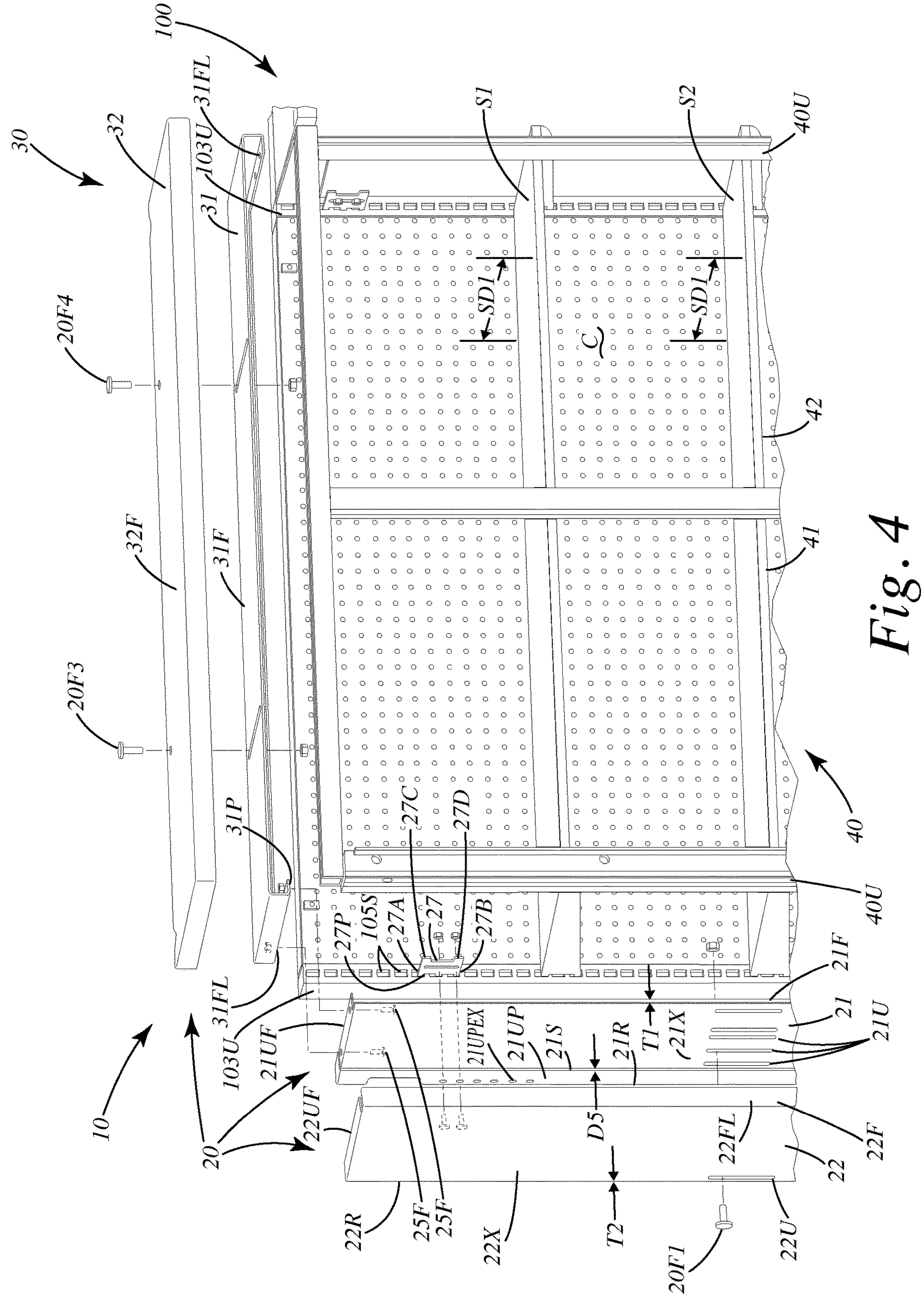
FIG. 4 is a perspective view of adjustable depth system and the side panels and top panels adjusted and secured to set a fixed depth to accommodate shelves of a particular depth.

A current embodiment of the security case is shown in FIGS. 1-16 and generally designated 10. The security case shown there includes an adjustable depth system 20 and a moveable reinforced transparent closure 40. These systems and the components thereof can be present alone or in combination with one another, and alone or in combination with the toe kick levelling system 80 of an alternative security case shown in FIGS. 17-22. The various components, systems and embodiments herein can be mixed and matched in any manner depending on the application.

The security case 10 can be configured to be secured to a retail shelving unit 100 referred to herein as a sales rack or gondola. The gondola 100 shown in FIGS. 1 and 2 can include a structural base 101 which rests on and can be secured to a ground surface G, typically a concrete or finished surface in a building structure of a retail store. A base deck 102 can be secured over the base 101 and can serve as a bottommost or lower shelf as well to support products thereon. The base deck 102 can extend on opposing sides of the upright 103 to provide more storage space for products, for example, in opposing aisles of the retail store. The base deck 102 can define one or more sets of holes 102H which can be used to connect certain parts of the security case 10 to the gondola as described below. The base can include the upright 103 extending upward from the base deck 102. The upright can include one or more structural uprights 103U, optionally in the form of tubes or beams, to which one or more back walls 104 can be joined. These back walls can be mounted between the uprights 103U. The back walls can define one or more mounting holes 104H optionally forming a peg board. The uprights can include one or more shelf mounting rails 105. The shelf mounting rails 105 can serve to support a variety of shelving units, which can have a wide range of configurations. The shelf mounting rails or uprights 103U, 105 in general can be punched with a row of rack slots 105S that can be configured to engage shelf brackets, for example flip brackets 60 or other types of fixed and integral brackets (not shown) in other applications and the like for supporting shelves S1, S2 and the merchandise the shelves may carry.

Figure 8:
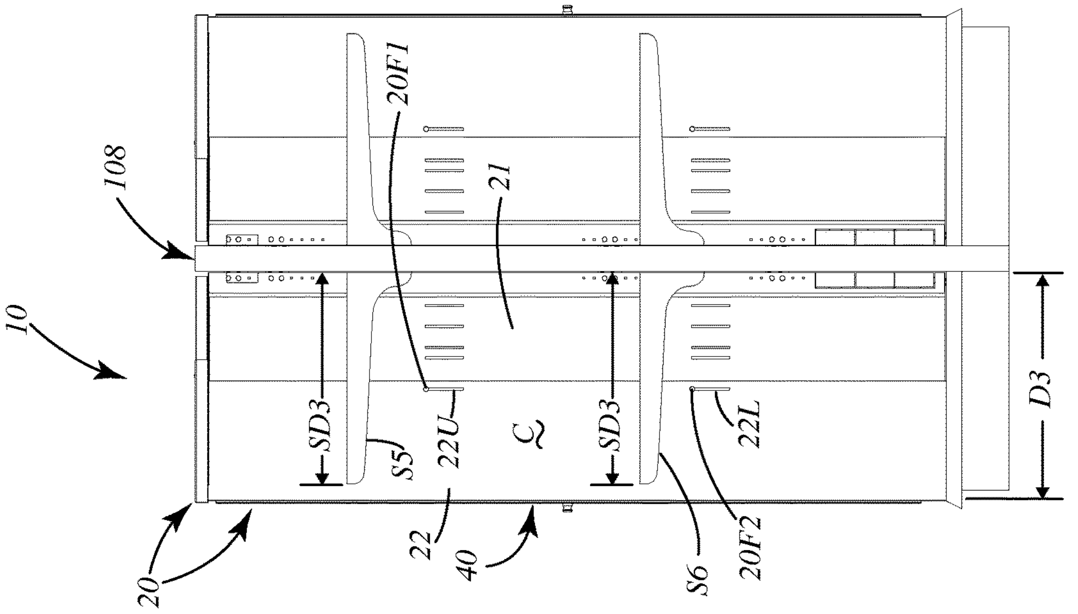
FIGS. 6-8 are side views of the adjustable side panels configured in different orientations to accommodate different shelves having different shelf depths on different gondolas.
Figure 7:
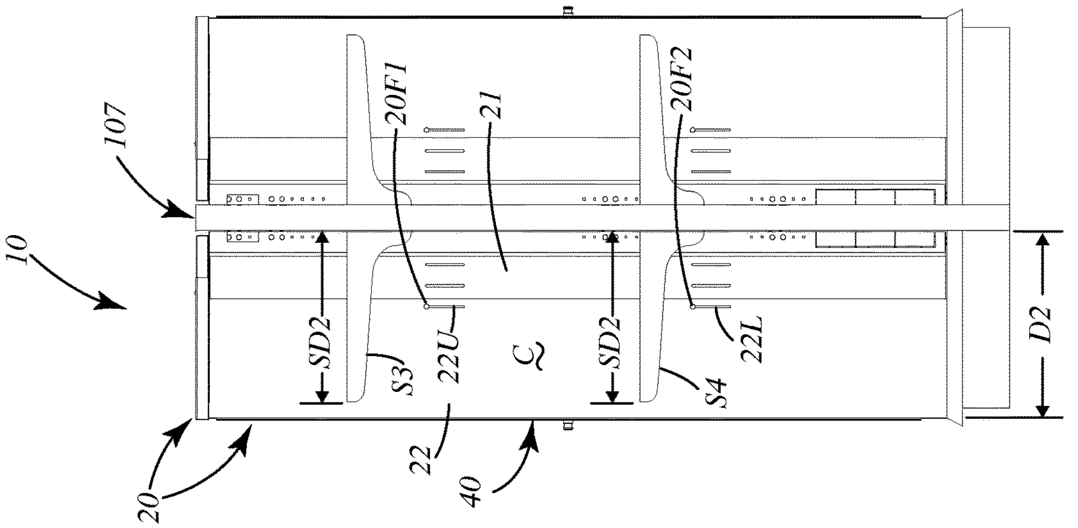
Figure 6:
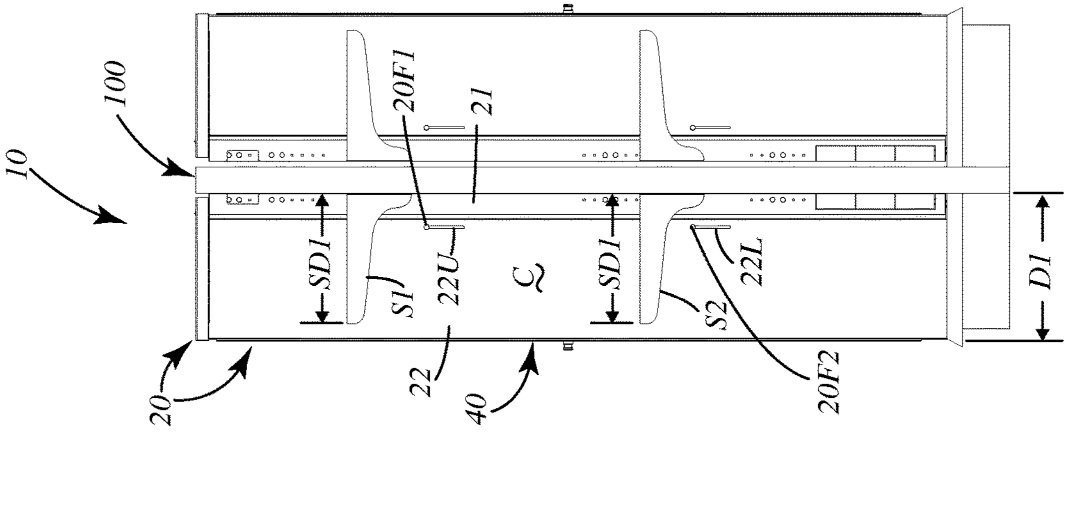

The shelves S1 and S2, for example, can be any type of retail shelf. The shelves can each include a support surface S1S, S2S upon which products can be placed. The shelves can include one or more prongs or fingers on the support brackets that face the upright 103 and fit into the rack slots 105S of the uprights to support the shelves thereon. Depending on the gondola and the type of shelf to be fitted to the gondola, the shelves can come in a variety of different shelf depths. For example, as shown in FIGS. 6-8, the shelves S1 and S2 can be of multiple different shelf depths SD1, SD2, SD3 and these shelf depths can be optionally 12", 14", 16", 18", 20", 24" or other shelf depths depending on the application. It will be appreciated that different retail stores can have multiple gondolas with multiple different shelves having multiple different shelf depths. Thus, when a security case is to be placed on a gondola, for example a new or existing, in place gondola, it is suitable to have the adjustable depth system 20 to accommodate those gondolas and different shelf depths for easy installation, a reduction in parts for assembly over and around different depth shelves and general adjustability so that the shelf space is preserved and maximized, even after the shelves are encased inside an internal compartment C of the case 10.

With further reference to FIGS. 1-8, the adjustable depth system 20 can optionally include first 21 and second 22 side panels on one side of an internal compartment, and third 23 and fourth 24 side panels on an opposing side of the internal compartment. Additional side panels can be included within the security case if the internal compartment is to be further separated into sub compartments. It will be appreciated that the side panels can be included in additional security cases disposed along the same gondola to provide adjustability to the overall depth of security case relative to the shelves and their depths. In general, the first 21 and second 22 panels can be substantially similar to the third 23 and fourth 24 side panels, so only the first and second side panels will be described here.

The first 21 and second 22 side panels can be configured as separate independent panels. These panels can move relative to one another, be attached secured in a fixed manner relative to one another after having been moved and set to accommodate a particular shelf depth. This telescoping feature of the side panels can be implemented in a variety of ways. As shown, the first panel 21 can define multiple elongated slots, for example, upper slots 21U and lower slots 21L. The second panel 22 can include a single upper slot 22U and a single lower slot 22L. And maybe more than one of these upper and lower slots in the second panel depending on the application. The slots 22U and 22L can likewise be vertical. The upper slot 22U and lower slot 22L of the second panel 22 can be aligned with preselected ones of the upper slots 21U and lower slots 21L of the first panel 21 such that the first rear edge 21R of the first panel 21 is set a preselected distance D1 from the front edge 42F the second panel 22. That distance D1 can be greater than or equal to the first depth SD1 of the shelves S1 and S2. Accordingly, when the transparent closure system 40 the security case 10 is installed, it will be forward of the front edges S1F and S2F of the respective shelves S1 and S2 so the case 10 extends around those shelves supported on the upright 103 of the gondola 100, generally within compartment C formed by the security case around those shelves.

To secure the panels to one another, fasteners 20F1 and 20F2 can be positioned and disposed in and through the second upper slot 22U and one of the corresponding first upper slots 21U and fastened in place with a nut secured to the fastener to hold the panels, optionally clamping those panels together. Likewise, where the lower slots 21L and 22L are included, another fastener 20F2 can be disposed through the second lower slot 22L of the second panel and a corresponding one of the first lower slot 21L of the first panel with a nut joined thereto, to further secure the first panel and the second panel to one another. With the panels fixed to one another, the distance D1 between the second front edge 22F and the first rear edge 21R can be set and established, and the panels can form a secure, rigid sidewall of the security case 10. Of course, to accommodate different depth shelves, any one of the first upper slots 21U and first lower slot 21L can be aligned with the respective second upper slot 22U and second lower slot 22L. Generally, the farther from the rear edge 21R that the upper slot 22U and lower slot 22L are placed, the greater the distance D1 from the front edge 22F and the rear edge 21R becomes. Accordingly, these different distances can accommodate shelves of different depths as described below.

Figure 5:
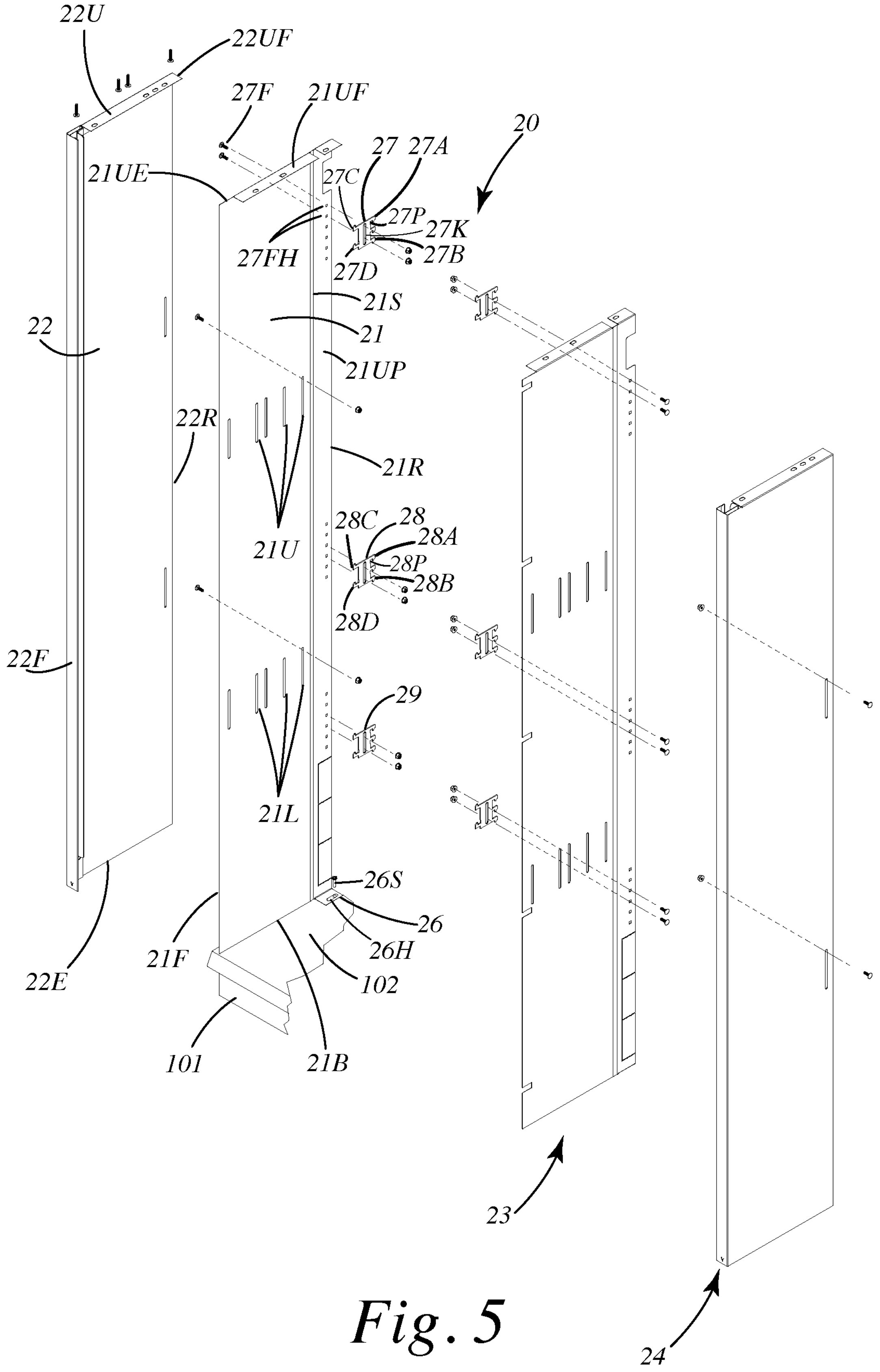
FIG. 5 is an exploded view of the first and second side panels and associated flip brackets, with opposing third and fourth side panels, and associated flip brackets.

More particularly, as shown in FIG. 5, the first side panel 21 can include a first upper edge 21UE and an opposing first lower edge 21B. These edges can be continuous with the respective first rear edge 21R and the first front edge 21F. The panel 21 can define the multiple first upper slots 21U which can be vertically oriented and parallel to one another. These first upper slots can be disposed downward vertically from the first upper edge 21UE. These slots can be regularly and/or irregularly spaced from one another having different distances between each of the respective slots 21U. Each of the slots 21U optionally can be parallel to the front edge 21F and the rear edge 21R, and perpendicular or transverse to the upper edge 21UE and lower edge 21B. The upper edge 21UE can include a flange 21UF that can define one or more holes therein to receive fasteners there through. These holes and fasteners can be used to secure the first panel 21 to a top panel as described below.

The first panel 21 can include a connector tab 26. The connector tab 26 can extend transverse and optionally perpendicular to the panel adjacent the first lower edge 21B of the panel 21. This connector tab can define a connector tab fastener hole 26H through which a fastener 26S can extend and secure the connector tab and thus the side panel to a base deck 102 and/or the base 101 of the gondola 100 when the side panel is installed. This can provide extra strength and rigidity to the side panel. In some applications multiple connector tabs can be secured to and extend from the side panel 21, particularly along the lower edge 21B. The multiple connector tabs likewise can be configured to be fastened down to the base deck to provide extra strength and rigidity to the panel.

As shown in FIGS. 1-5, the first side panel optionally can be in the form of an interior side panel. This interior side panel can be spaced inward, toward the internal compartment C. The second panel 22 can be in the form of an exterior panel. The first panel 21 also optionally can include a first shoulder 21S in FIG. 5 that is between the rear edge 21R and the respective upper slots 21U and lower 21L slots. This shoulder can extend from the upper edge 21UE to the lower edge 21B. This shoulder can form a portion of or transition to a first side panel upright 21UP. This upright 21UP can provide additional strength rigidity in the region along the rear edge 21R where the side panel 21 is secured to one or more brackets that attach that first side panel 21 to the uprights 103U of the gondola 100 as described below. In some cases, this upright is simply a bent portion of the side panel as it nears the first rear edge 21R. In other cases, this upright 21UP can be a tubular structural member that is joined or integral with the side panel near the first rear edge 21R.

Further optionally, where included, the upright 21UP can include an outer or upright exterior surface 21UPEX. This upright exterior surface can extend a distance DS outward from the exterior surface 21X of the first side panel 21 in which the slots 21U and 21L are defined. This distance DS can be where the shoulder 21S is formed. The second panel 22 optionally can form an exterior panel that is disposed exterior to the interior panel 21 and further exterior to the internal compartment C of the security case 10. The second panel 22 can include an exterior surface 22X, which generally faces outward from the internal compartment C and forms a portion of the exterior of the adjustable depth system 20 on a side of the case 10. This exterior surface 22X can transition and/or can be flush with the upright exterior surface 21UPEX. The second rear edge 22R can abut against the shoulder 21S when the second panel is disposed adjacent the exterior surface 21X of the first panel and the first and second side panels are extended the minimum distance of extension. Yet further optionally the upright exterior surface 21UPEX can be flush and/or lay within the same plane as the exterior surface 22X of the second panel 22. In some cases, the thickness T2 can be less than or equal to the distance DS, causing the second panel 22 to nest or lay within a region of the first panel 21 formed by a boundary delineated by the shoulder 21S. Of course, in other applications the shoulder and upright of the first panel can be absent and the first and second panels can be substantially planar elements that simply slide or move adjacent one another until they are fixed in position with respective fastener 20F1 and 20F2 to set a particular depth between the first rear edge 21R of the first panel and the second front edge 22F of the second panel 22.

As mentioned above, the first and second panels 21 and 22, as well as the third and fourth panels 24 can move and generally telescope relative to one another when being installed relative to a gondola 100 to construct a security case 10. A user can determine the overall depth of a shelf, for example the shelf depth SD1 and configure the side panels so that the transparent closure system 40 clears the forward most portions of the respective shelves S1 and S2 when the remainder of the case 10 is constructed and installed relative to the gondola 100. It will be appreciated that during an installation operation of the panels, a user can extend and/or telescope the second panel 22 relative to the first panel 21 to varying degrees to accommodate different shelf depth. As a result, the distance D1 between the first rear edge 21R of the first panel 21 and the second front edge 22F of the second panel 22 can vary. For example, with reference to FIGS. 6-8, the distance D1 can be varied to alternative distances D2, D3 and so on to accommodate shelves S3, S4 and S5, S6 having different respective shelf depths SD2, SD3 and so on. By varying the distances to the alternative distances D1, D2, D3 and so on, the user can construct the case 10 to fit the particular shelves associated with the respective gondolas 100, 107, 108 in FIGS. 6-8 or other configured gondolas. When the remainder of the case is constructed, for example the transparent closure system 40 is positioned and attached to the adjustable depth system 20, that closure system 40 can be forward of and can provide clearance for the respective shelves S1-S6 in the various gondolas. After the distance is selected to correspond to a particular shelf depth, a user can install fastener 20F1 through the second upper slot 22U aligned with a corresponding upper slot 21U of the interior panel 21, installed fastener 20F2 through the second lower slot 22L aligned with a corresponding lower slot 21L of the interior panel 21. Where the fastener is a screw, an associated nut can be joined with a screw to fasten, secure and/or clamp the panels to one another in a secured configuration to the distance between the first rear edge in the second front edge and thus the overall depth of the panels relative to the gondola and shelves.

The adjustable side panels 21-24 can be secured to the gondola 100 and in particular the uprights 103U as well as the transparent closure system 40, generally spanning between the back wall 104 of the gondola to the first and second transparent panels 41, 42 of the transparent closure system 40. These components can form the internal compartment C, along with the top panel 30 above the internal compartment C and the base or deck 102 of the gondola below the internal compartment C. The second front edge 22 of the second side panel 22 can be secured to the upper 40U of the transparent closure system 40 that is disposed laterally relative to the transparent panels 41, 42. Optionally, the second front edge 22F can include a second front flange 22FL that can be fastened, bolted or screwed to the upright 40U after the side panels 21 and 22 are adjusted and extended relative to one another to accommodate a particular shelf depth.

The first panel 21 can be constructed in different ways to be able to secure to the upright 103U of the gondola 100. As one example, shown in FIGS. 4-5, the first panel 21 can include or can be joined with one or more brackets to secure that panel to the gondola upright 103U. Optionally, the one or more brackets can be in the form of brackets, such as a first flip bracket 27, a second flip bracket 28, and the third flip bracket 29. Such brackets can be likewise joined with the third panel 23 similar to the first panel 21 but reversed and on the opposite side of the internal compartment. Of course, a different number of flip brackets can be included in the construction. These flip brackets can include fingers and prongs that can be oriented in different directions to secure the bracket to respective rack slots 105S of the gondola upright 103U. The first, second and third flip brackets can be substantially identical so only the first flip bracket 27 will be described here.

As shown in FIGS. 5 and 6, the first flip bracket can have a first pronged finger 27A, a second pronged finger 27B below the first pronged finger, a third pronged finger 27C opposing the first pronged finger 27C and a fourth pronged finger 27D opposing the second pronged finger 27B. Each of these respective fingers can include a prong 27P that is transverse to and projects from the finger 27A to provide an edge, lip and/or shoulder projecting from the finger. When pronged finger 27A is inserted into a respective rack slot 105S, the prong 27P can engage a bar or tab that is adjacent the bottom portion or upper portion of the slot. When it does so, the prong can secure the finger and the bracket in the slot and to the upright. In so doing, the first side panel 21 can be rigidly secured to and/or hung from that gondola upright 103U. Likewise, the second flip bracket can have a first pronged finger 28A, a second pronged finger 28B below the first pronged finger, a third pronged finger 28C opposing the first pronged finger 28C and a fourth pronged finger 28D opposing the second pronged finger 28B. Each of these respective fingers can include a prong 28P that is transverse to and projects from the finger 28A to provide an edge, lip and/or shoulder projecting from the finger. The pronged fingers of the second flip bracket can be configured similar to the pronged fingers of the first flip bracket.

Each of the respective brackets 27, 28 and 29 can be flipped upside down to engage other types of slots or to otherwise engage a particular slot in a different manner. It will be appreciated that the flip brackets can be substituted with other brackets that are not reconfigurable or able to be flipped. Further, although the flip brackets are shown as being attached via fasteners 27F to the side panel 21 and its upright 21UP, the brackets optionally can be welded and/or integrally formed with that side panel 21. As shown, however, the flip brackets are secured with fasteners to the side panel 21. For example, the first panel 21 in particular, its upright 21UP can define one or more fastener holes 27FH as shown in FIG. 5. The fastener 27F can extend through those fastener holes 27FH as well as fastener holes 27K defined by the flip bracket 27. Respective nuts can be secured to the fasteners to secure the flip bracket to the upright 27UP and thus the first side panel 21. Corresponding fasteners and holes can be included in the first side panel, as well as the second bracket 28 and third bracket 29 to secure those brackets to the side panel. Further, although shown as including particular brackets with prongs that fit within rack slots defined by a gondola upright, in cases where rack slots are not included in a particular sales rack, other types of brackets can be used to secure the side panels to the sales rack and still provide the adjustable depth system 20 on that sales rack or gondola.

As mentioned above, and shown in FIGS. 3-4, the security case 10 and particularly the adjustable depth system 20 can include a top panel 30 including a first upper panel 31 and a second upper panel 32. Optionally, the first upper panel can be an upper interior panel and the second upper panel can be an upper exterior panel. As shown, these panels can be telescopically arranged relative to one another so that they can be extended in depth and/or distance to match the respective depth of a shelf in the security case. As an example, the first panel 31 can include a first rear edge 31R and the second panel 32 can include a second front edge 32F. The distance D1 between the front edge 32F and rear edge 31R can be altered by moving or sliding the second panel 32 relative to the first panel 31. After a particular distance is achieved to accommodate a particular shelf depth or distance corresponding to the extension of the first side panel 21 and second side panel 22, fasteners 20F3 and 20F4 can be installed through holes 31H1 and 32H2 defined by the second panel 32 and further through aligned slots 31S1 and 31S2 defined in the first panel 31. The fasteners 20F3 and 20F4 can be joined with respective nuts to clamp the panels together and hold them in a fixed position relative to one another and thereby fixing the distance D1.

Depending on the configuration of the top panel, the upper panels can be reconfigured and reoriented, telescoping and moving relative to one another to generally match the overall distance D1 between the front and rear edges of the upper panels to the distance D1 between front and rear edges of the side panels. Of course, where the user selects different distances, such as the distances D2 or D3 in FIGS. 7 and 8, the respective first upper panel 31 and second upper panel 32 can likewise be telescoped and extend or retracted relative to one another to match those distances D2 and D3 and thereby accommodate the respective shelves shown in those figures. Optionally, in other applications, the top panel 30 can be a single, uniform panel that does not have any adjustability or telescoping features. In such an application, the side panels 21 and 22, as well as 23 and 24, can be adjusted or telescoped to accommodate a particular shelf depth, and then the top panel can be selected and installed on the case. This top panel, however, would be selected to include a distance between its front edge and rear edge to match the distance D1, D2 or D3 etc. of the side panels and the accommodate the respective shelves.

As shown in FIGS. 1-5, the top panel 30 can be joined, attached and/or secured to the respective side panels 21, 22 as well as side panels 23 and 24. In this embodiment, however the top panel 30 and each of the respective upper panels 31, 32 remain unattached, unsecured and unfixed to the gondola upright 103 and its respective wall 104, as well as the upright beams 103U. Thus, the top panel 30 can be free floating relative to the upright 103 and the walls 104 as well as the individual uprights 103U. This can reduce the overall complexity of assembly and installation of the top panel and the side panels to which the transparent closure is connected. The top panel 30 can include the respective first upper panel 31 and second upper panel 32. The first upper panel can include flanges 31FL along the respective side edges thereof. The flanges 31FL can define apertures or holes therein and can generally be of a U-shaped or L-shaped configuration. The lower portion 31P of the flange 31FL can be fit and can extend adjacent the upper flanges 21UF and 22UF of the respective side panels. Fasteners 25 can be installed to extend through respective holes in the flanges 21UF and 22UF along the respective first and second upper edges of the first and second panels and as well as holes defined by the flange 31FL that are aligned with the holes in the side panel flanges. The fasteners 25 can extend through holes defined through the upper flanges 21UF and 22UF and through the holes defined by the lower portion 31P of the flange 31FL. The fasteners can be coupled to respective nuts and tightened to secure the top panel to the side panels a rigid and secure manner. Of course, other structures and features can be used to join and/or secure the top panel to the side panels during construction of the security case.

The security case closure system 40 can include one or more transparent closure systems 40. A transparent closure system 40 can be installed forward of the shelves S1 and S2 inside the internal compartment C. The transparent system can be at least partially transparent so that the viewer can view through the closure to the respective shelves in the internal compartment, optionally viewing any products on the shelves. As explained above, the transparent closure system 40 can include lateral uprights 40U which can be joined with respective side panels or other portions of the security case 10 to define the boundaries of an opening to the internal compartment C that is covered by the transparent closure system 40. The transparent closure system can include a first transparent panel 41 and a second transparent panel 42 that are disposed forward of the internal compartment C and optionally movable relative to one another. These panels 41, 42 can be registered within and/or guided by an upper door track 30U and a lower door track 50. The upper door track 30U can be a U-shaped track that is joined with the top panel 30, while the lower door track 50 can be a more complex and supportive door track as described below.

The first transparent panel 41 and second transparent panel 42 can be a polymeric transparent panel optionally constructed from a material such as a thermoplastic polymer containing carbonates, and further optionally in the form of a polycarbonate panel or sheet. Yet further optionally, the material can have a density of 1.20 to 1.22 g/cm3. Further optionally, such materials can have a Young's Modulus of 2.0 to 2.4 GPa, a Tensile Strength of 55 to 75 MPa, an Elongation at Break of 80% to 150%, and/or a Compressive Strength greater than 80 MPa. The transparent panel or sheet can have a thickness T2 which can be optionally 3 mm to 15 mm, 5 mm to 10 mm, 3 mm to 6 mm, 4 mm to 8 mm or other thicknesses depending on the application.

Figure 11:
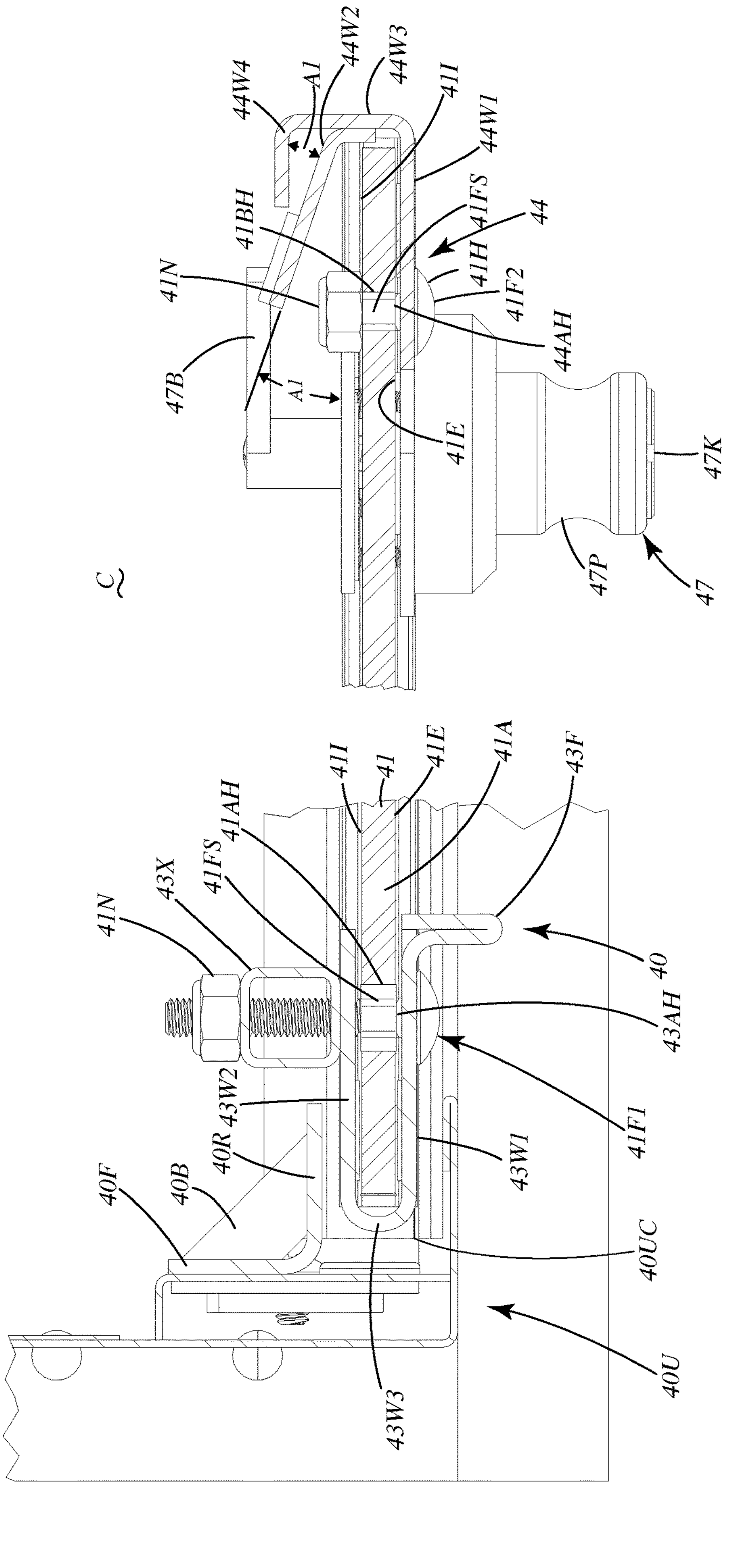
FIG. 11 is a section view of the first transparent panel illustrating the interface of the channel members with the panel.

The first transparent panel 41 and the second transparent panel 42 can be substantially similar so the first transparent panel 41 will only be described in significant detail here. The first transparent panel 41 can be movably disposed adjacent the first and second side panels 21 and 22. As mentioned above, the transparent closure upright 40U can be joined with the second side panel 22. The first panel 41 can be configured to interlock with the transparent closure upright 40U to provide security and/or integrity to security case 10. For example, as shown in FIG. 11, the first upright 40U can include a U-shaped channel 40UC. The U-shaped channel can trap a portion of the first transparent panel 41 therein along its lateral edge. The U-shaped channel can include a rear wall 40R. The rear wall can be joined with a supporting buttress 40B that extends to a flange 40F. The buttress can further support the channel and prevent the first transparent panel 41 from being pushed inward into the internal compartment C. Generally, the channel 40UC can be fortified and rather rigid to prevent a breach into the internal compartment C by forcing the first transparent panel 41 inward and bending it or causing it to breach, allowing access to the internal compartment C.

Figure 10:
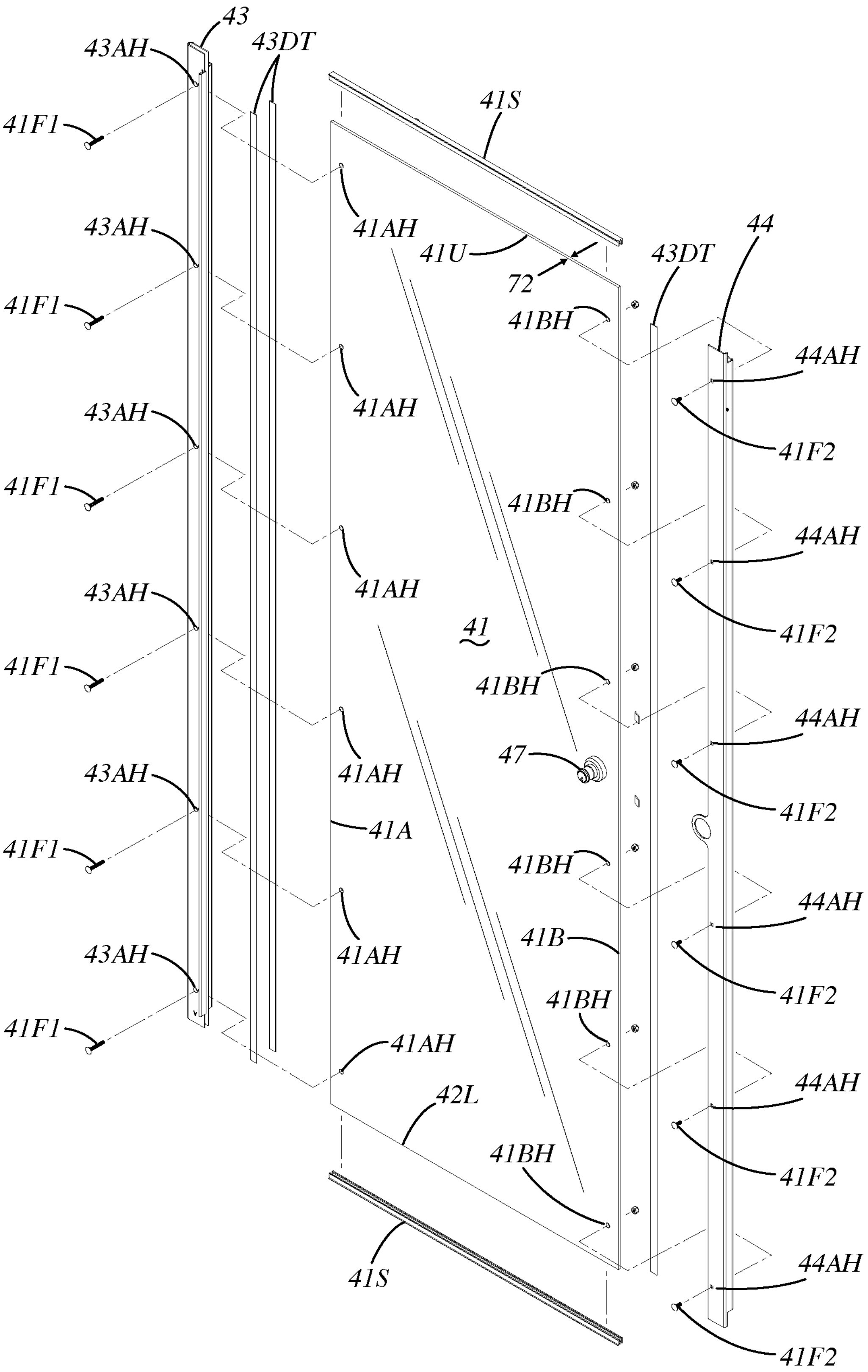
FIG. 10 is an exploded perspective view of a first transparent panel, the transparent panel defining multiple holes along opposing lateral edges, first and second channel members that fit over the edges with their own set of corresponding holes, and a set of fasteners that fit through the holes in the first transparent panel and the channel members when disposed on the lateral edge to provide rigidity to the first transparent panel.

With further reference to FIG. 10, the first transparent panel 41 can include a first panel lateral edge 41A and a second panel lateral edge 41B opposite the first panel lateral edge 41A. The panel 41 also can include an upper edge 41U and an opposing lower edge 41L. The upper edge can include a door shoe 41S that is disposed over or around the edge. The door shoe 41S can be of a U-shape and can fit over the edge. The lower edge 41L can also include a similar door shoe 41S that engages or extends fully or partially around the lower edge 41L of the first transparent panel 41.

The first transparent panel 41 can define a plurality of holes to attach reinforcement members to the panel. For example, the first transparent panel 41 can include a plurality of evenly spaced holes through the panel and through the complete thickness T2. First panel holes 41AH can be defined along and/or adjacent the first lateral edge 41A. These holes 41AH optionally can be circular or round holes that extend through the thickness T2. Second panel holes 41BH can be defined along and/or adjacent the second lateral edge 41B. These holes 41BH optionally can be circular or round holes that extend the thickness T2. The first panel holes and a second panel holes again can be evenly spaced along the second lateral edge and from one another, and can extend along respective lines between the upper edge 41U and the lower edge 41L. Further optionally, the upper edge 41U and lower edge 41L can be void of any holes.

The panel holes 41AH and 41BH can be shaped and sized to receive the shafts of respective fasteners therethrough. For example, as shown in FIGS. 10-11, multiple first fasteners 41F1 can be configured to extend through the first holes 41AH along the first lateral edge 41A. Additional fasteners 41F2 can be configured to extend through respective second holes 41BH along the second lateral edge 41B. Optionally, these fasteners each can individually be in the form of a screw or bolt having, for example, as shown in FIG. 11 a head 41H, a shaft 41FS and a nut 41N that threads onto the shaft as described below. Although shown as screws or bolts, the fasteners can be in the form of pins, dowels, shafts, bars or other items that can extend through the panel 41 and join with one or more channel members 43 and 44 as described below. In certain applications, the holes can be absent from the transparent panel and its edges, and rather be fastened, the channel members 43 and 44 can be glued, bonded, cemented, fused, friction fit, melted to or otherwise attached along the lateral edges of the transparent panel.

As mentioned above, the first transparent panel 41 can be joined with one or more channel members 43 and 44. The first channel member 43 can overlap the first panel lateral edge 41A and can define multiple first channel holes 43AH. These first channel holes 43AH can overlap and can be aligned with the first panel holes 41AH and the respective first fasteners 41F1 can be disposed through the holes 43AH and 41AH simultaneously. Likewise, the second channel member 44 can overlap the second panel lateral edge 41B and can define multiple second channel holes 44AH which can overlap and be aligned with the second panel holes 41BH in the second lateral edge 41B. The respective first channel fasteners 41F2 can be placed and extend simultaneously through the second channel member 44 and the second lateral edge 41B of the first transparent panel 41. Each of the respective first channel holes and second channel holes can be spaced evenly along the length of the respective first channel member 43 and second channel member 44.

Although each of the channel members 43 and 44 can come in a variety of configurations, one configuration is an L-shape or U-shape as shown in FIG. 11. There, the first channel member 43 includes a first channel wall 43W1, a second channel wall 43W2 and a third channel wall 43W3 extending from the first channel wall to the second channel wall, generally connecting those walls. The first channel wall 43W1 can face toward and optionally contact the exterior surface 41E of the first transparent panel 41. The second channel wall 43W2 can face toward and optionally contact the interior surface 411 of the first transparent panel 41. The third channel wall 43W3 can extend beyond the first lateral edge 41A. Optionally, in some applications, material such as double-sided tape 43DT can be disposed between the transparent panel and the respective first channel wall and/or the second channel wall. This can provide securement of the channels to the transparent panel and/or provide extra shock absorption between the channels and the transparent panel.

As in FIG. 11, the first channel member 43 optionally can include a grasping flange 43F, which can allow a user to engage and move the transparent panel 41 relative to the door tracks in which it is movably disposed. This grasping flange 43F can extend along the length of the first channel member as shown, or can be truncated and shorter along only a portion of the length. The grasping flange optionally can be located farther from the outermost portion of the lateral edge 41A than the fasteners 41F1 and their holes 41AH.

FIG. 11 illustrates a reinforcement element 43X which can be in the form of a tube, a bar and/or plate that can be joined with and/or placed adjacent the first channel member 43, for example the second channel wall 43W3. The reinforcement element 43X can define one or more holes through it which can enable the reinforcement element 43X to be joined with the channel and/or the transparent panel 41 via the one or more fasteners 41F1. In other applications, the reinforcement element 43X can be welded and/or secured to the first channel member 43 in any manner. Further, the reinforcement element 43X optionally can be placed adjacent and/or joined with the first channel wall 43W1 in other applications. In yet other applications, the reinforcement element 43X can be deleted from the transparent closure system. As can be further seen in FIG. 11, the second channel member 44 can be constructed without a reinforcement element like 43X. Where there is no reinforcement element 43X, the respective fastener 41F2 extending through the channel member 44 to join the channel member 44 with the first transparent panel 41 can be shorter than the one extending through the channel member 43 to join that channel member 43 with the first transparent panel 41.

The second channel member 44 can be similar to the first channel member 43 in several ways but slightly different depending on the application. For example, the second channel member 44 can include a first channel wall 44W1 and a second channel wall 44W2 with a connecting wall 44W3 between and joining those respective channel walls. The first channel wall 44W1 can face toward and be adjacent the exterior 41E of the transparent panel 41 and the second channel wall 44W2 can face toward the interior surface 401 of the panel but can be offset at an angle A1 relative thereto. The angle A1 optionally can be 0° to 90°, 0° to 45°, 20° to 60°, 30° to 60°, 30° to 45°, about 45°, about 90°, or some acute or right angle depending on the application.

In the embodiment shown in FIG. 11, the channel member 44 also can include a fourth channel wall 44W4 that extends beyond and farther from the transparent panel 41 than the second channel wall 44W2. This fourth channel wall 44W4 can reinforce the second channel wall 44W2 if excessive force is placed upon it. Further, each of the second and fourth channel walls can extend along the second channel member within the internal compartment. These channel walls can be offset relative to one another by the same angle A1 described above or some other angle depending on the application.

Figure 9:
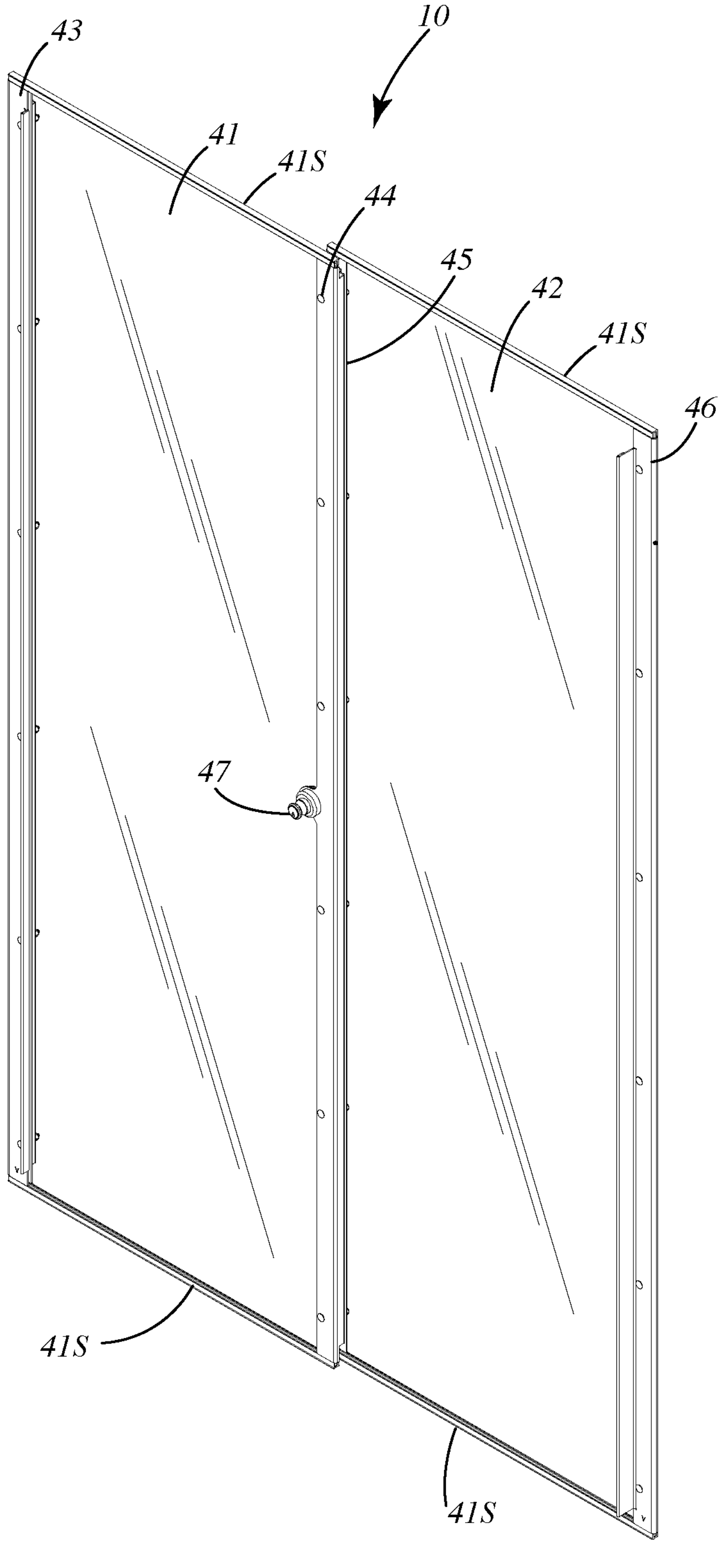
FIG. 9 is a front perspective view of the transparent closure, having a first transparent panel and a second transparent panel to close the security case.
Figure 12:
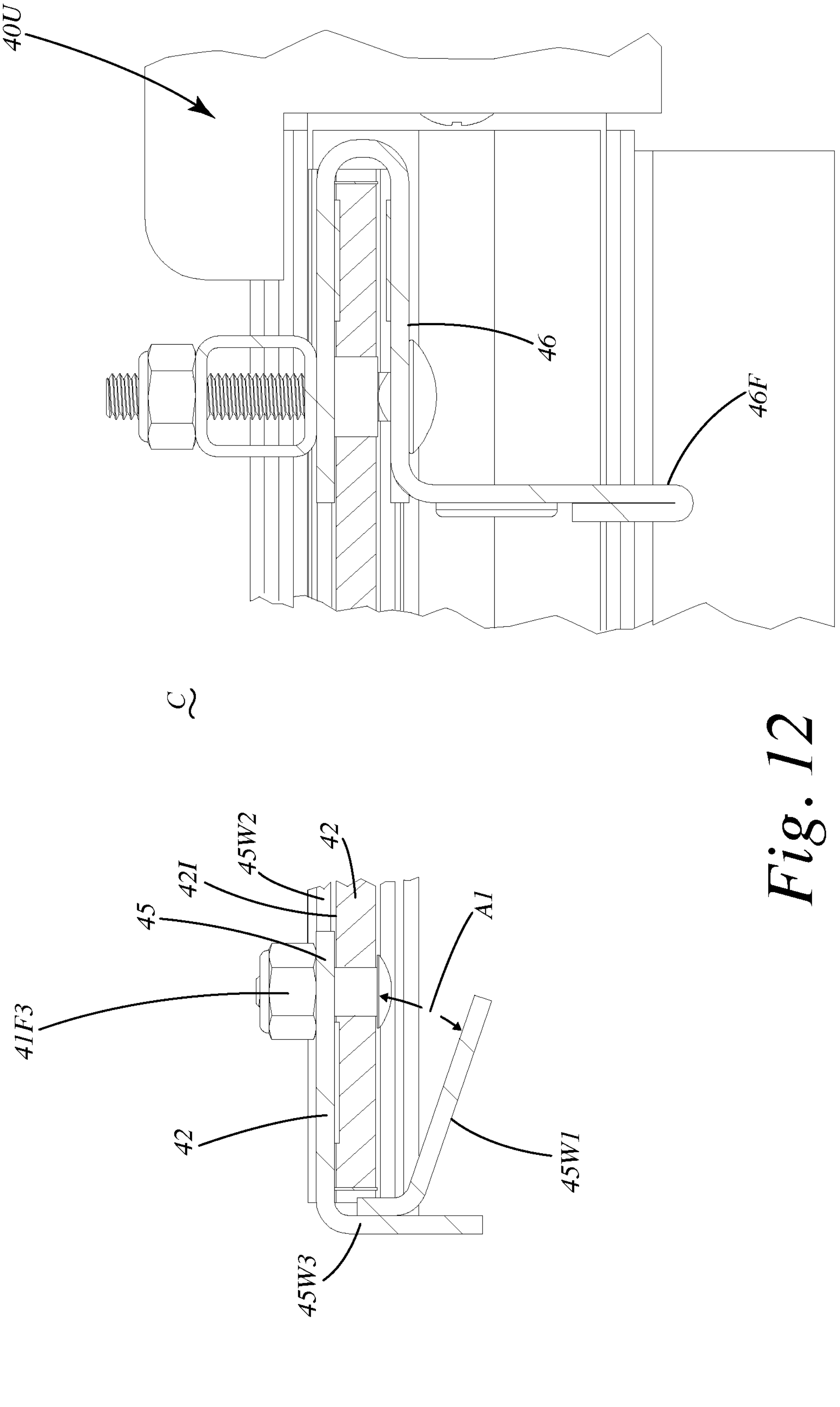
FIG. 12 is a section view of a second transparent panel illustrating the interface of the channel members with the panel.
Figure 13:
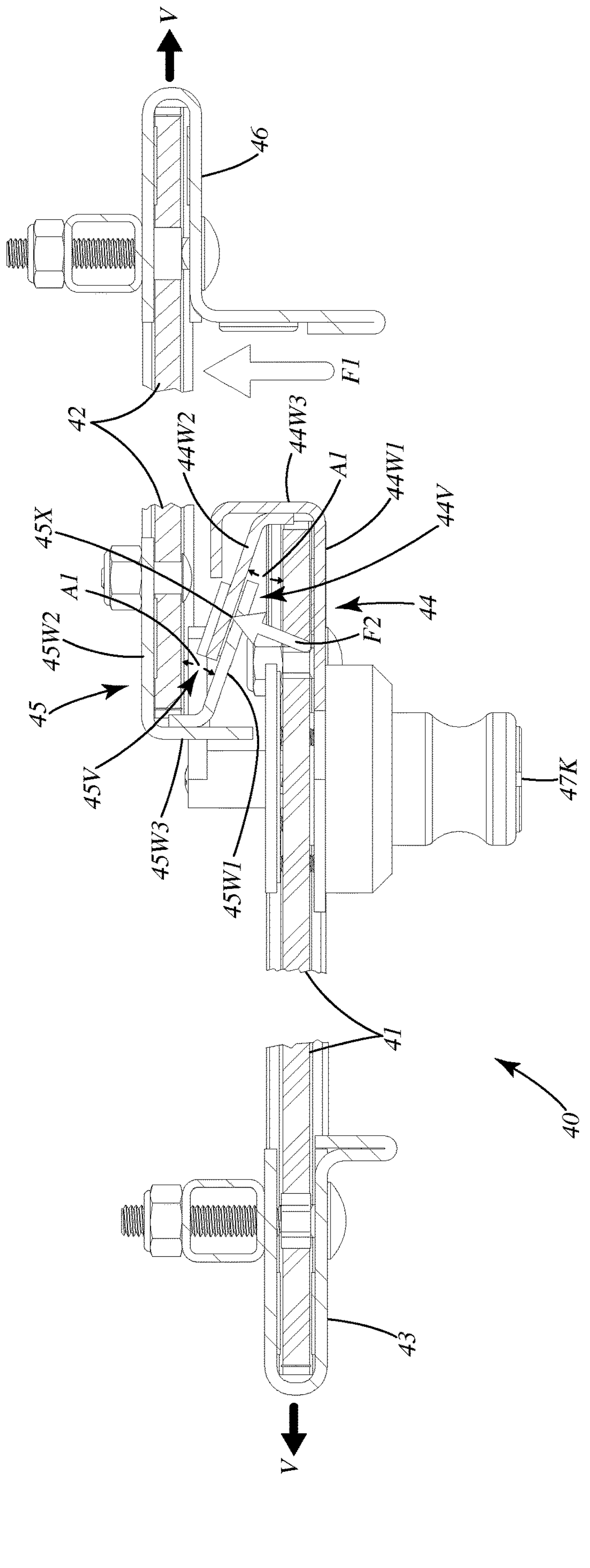
FIG. 13 is a section view of the first transparent panel being locked relative to the second transparent panels and an interface of offset flanges of respective channel members interlocking with one another.

As mentioned above, the system 40 can include the first transparent panel 41 and the second transparent panel 42. The second transparent panel 42 can be similar to the first transparent panel. With reference to FIGS. 9 and 12-13, the second transparent panel 42 also can include a third channel member 45 and a fourth channel member 46. These channel members 45 and 46 can be identical but somewhat mirror versions of the respective second channel member 44 and the first channel member 46. For example, each of these channel members 45 and 46 can be disposed on opposing lateral edges of the second panel 42. Each of the channel members can be secured with fasteners extending through the channel members and through the second transparent panel along the edges.

The third channel member 45 can be joined with the second transparent panel 42 in a manner such that the third channel member 45 can interlock with the second channel member 44 joined with the first transparent panel 41 and generally prevent either the first transparent panel or the second transparent panel from sliding past one another. When interlocked, these channel members 44 and 45 also can physically and structurally tie the first transparent panel and the second transparent panel of the transparent closure system 40 together to impair or prevent breach of the internal compartment C past the overlapping lateral edges of the transparent panels 41 and 42.

As shown in FIG. 12, the third channel member 45 can be joined with the lateral edge of the transparent panel 42. This joining can be via the fastener 41F3 extending through the channel member 45 in the holes defined by the second transparent panel 42 along the edge of that panel. This third channel member 45 can include a first channel wall 45W1 facing the exterior surface 42E of the transparent panel 42. The channel member 45 also can include a second channel wall 45W2 facing the interior surface 421 of the transparent panel 42. The second channel wall 45 W2 can be generally parallel to the interior surface 421. The first and second channel walls can be connected by a connecting wall or third wall 45W3. The first channel wall 45W1 in this channel member 45, however, can be disposed and offset at the angle A1 relative to the exterior surface 42B of the transparent panel 42 and/or the second channel wall 45W2. This angle A1 can be similar or identical to the angle A1 described above between the second channel wall 44W2 and the interior surface 411 of the first panel 41.

As mentioned above, the second channel member 44 and the third channel member 45 can interlock with one another to tie the first transparent panel 41 and second transparent panel 42 together. This is illustrated in FIG. 13, where the second channel member 44 interlocks with the third channel member 45. In this configuration, the second channel wall 44W2 of the second channel member is disposed adjacent the first channel wall 44W1 of the third channel member and the two are interlocked with one another. These two components engage one another in region 45X along the respective channel walls. Further, the first channel wall 45W1 enters into and is received in a locking void 44V defined by the second channel member 44. Likewise, the second channel wall 44W2 enters into and is received in another locking void 45V defined by the third channel member 45. If a user attempts to slide the panels 41 and 42 away from one another in directions V, the respective first channel wall 45W1 enters farther into the locking void 44B and the second channel wall 44W2 enters farther into the locking void 45V thereby further interlocking the panels with one another and preventing them from separating. Further, if a force F1 is applied to a transparent panel 42, that force translates to a reactive force F2 within the interlocked channel members 44 and 45, and due to the interaction of the channel walls 44W2 and 45W1, the respective channel members 44 and 45 remain tied and interlocked with one another to impair or prevent breach of the case 10.

With further reference to FIG. 11, the first transparent panel 41 can include a lock 47 secured thereto. The lock 47 can include a door pull 47P and can allow a user to move the first transparent panel 41, in addition to the grasping flange 43F. The lock 47 can include a keyed mechanism 47K so a user can manipulate the locking bar 47B to lock the first transparent panel 41 relative to the second transparent panel 42. In the locked condition, the two transparent panels 41 and 42 cannot be moved relative to one another or generally relative to the door tracks and/or the internal compartment to gain access to the internal compartment and any product that might be on the shelves within the internal compartment. Of course, a variety of different locks can be used with the transparent closure system to lock the panels.

Figure 14:
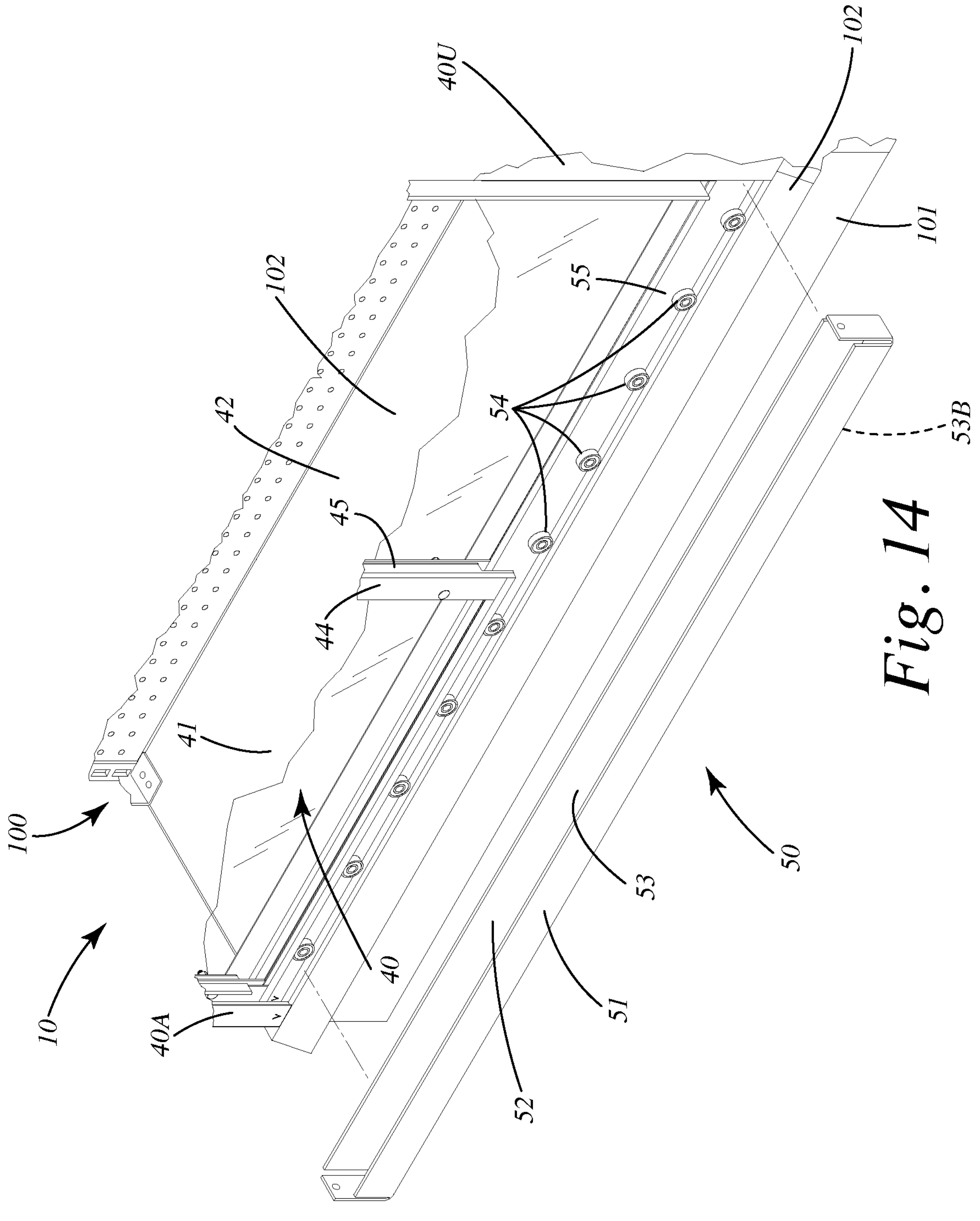
FIG. 14 is a partially exploded perspective view of the transparent closure system mounted in a lower door track having roller bearings and a support block within the door track.
Figure 15:
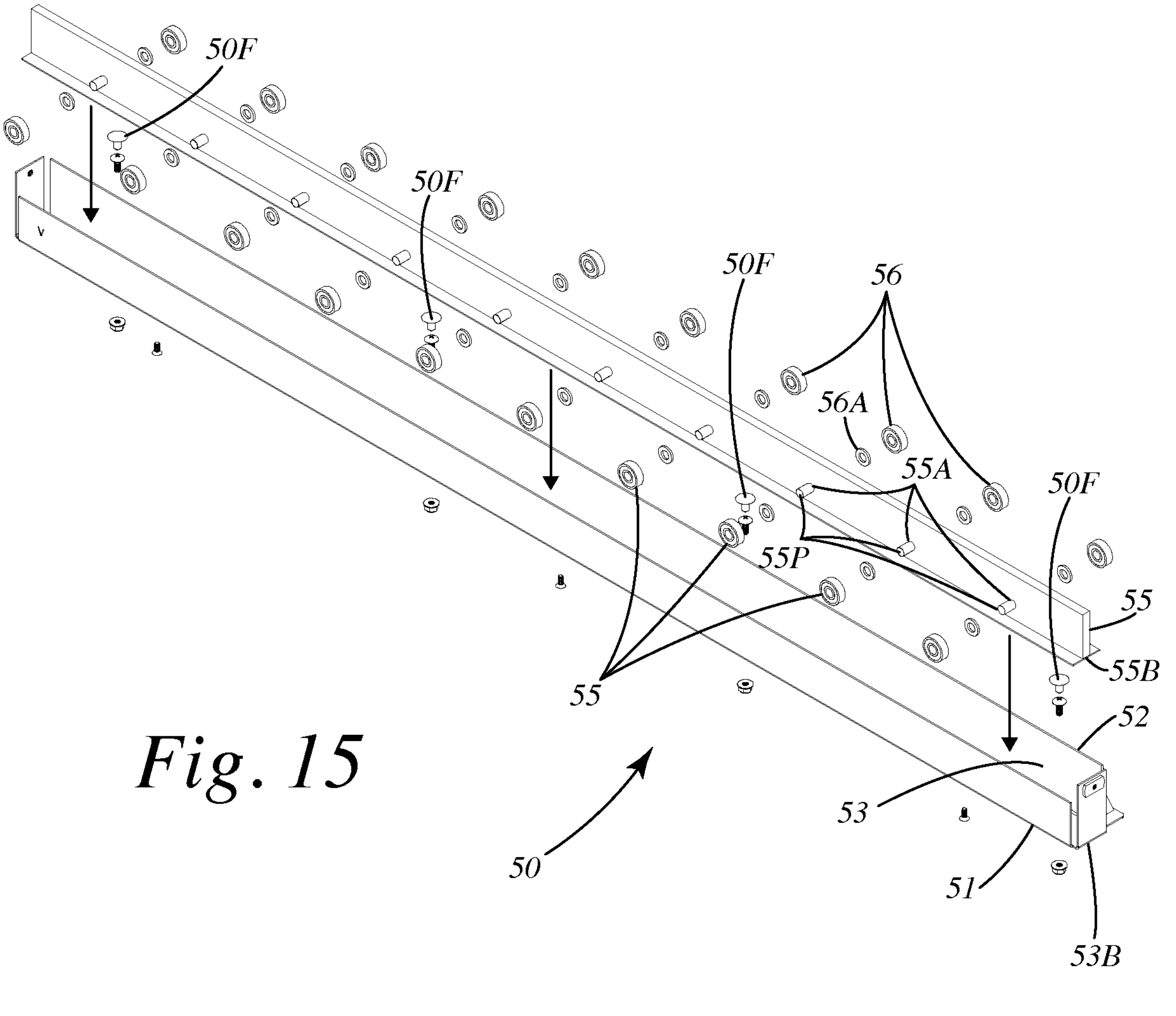
FIG. 15 is an exploded view of the door track showing the roller bearing system that supports a transparent panel.
Figure 16:
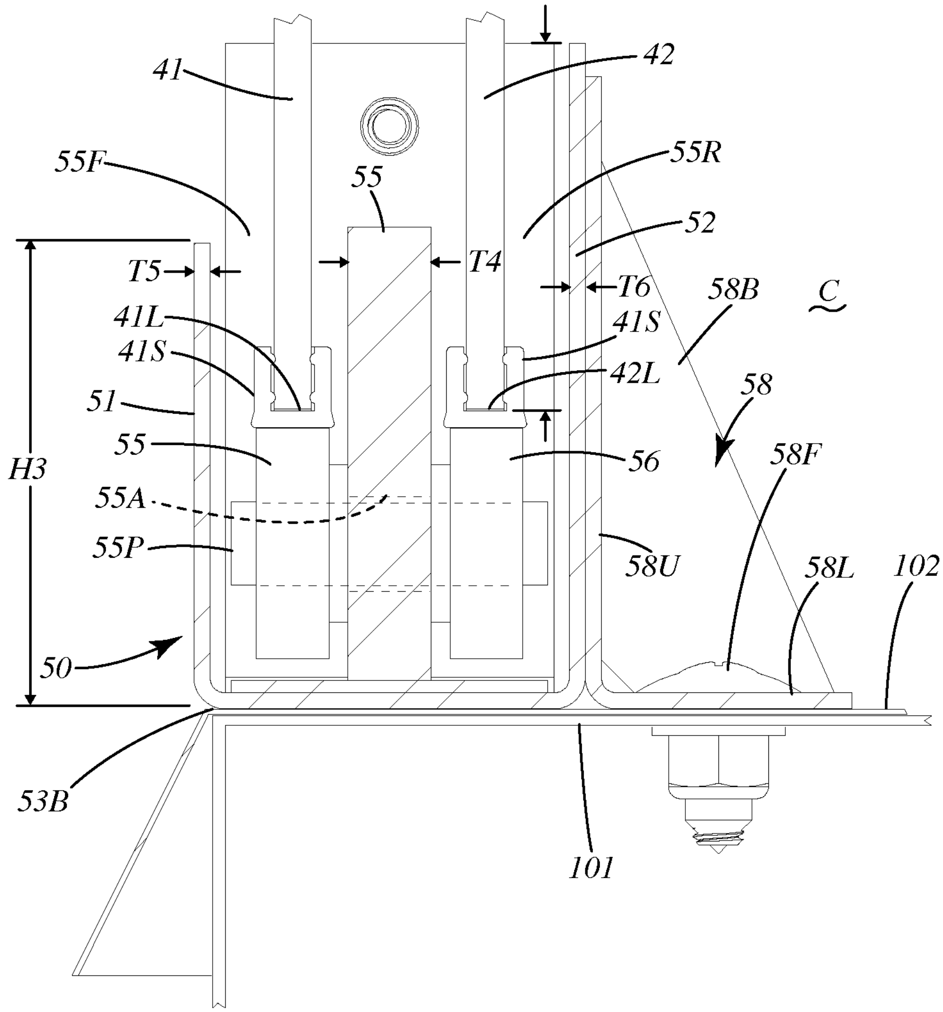
FIG. 16 is a section view of the lower door track mounted to a deck of a base of a gondola.

As mentioned above, the transparent closure system 40 can interface with a lower door track 50 along the lower portion of the closure system and the lower edges of the respective transparent panels 41 and 42. One exemplary and optional door track 50 is shown in FIGS. 14-16. This door track 50 can be used to support the transparent panels 41 and 42, allowing them to roll on bearing rollers 54, 56 and move smoothly and consistently when being opened and/or closed. This door track 50 can be defined forward of the internal compartment C and can include an upwardly opening track channel 53 that is bounded by a front wall 51, a rear wall 52 and a bottom wall 53B connected to the front and rear walls. A support block 55 can be disposed in the track channel 53 and can separate the track channel into a front door track 55F and rear door track 55R. The respective first transparent panel 41 can be disposed in the front door track 55F and the second transparent panel 42 can be disposed in the rear door track 55R.

As mentioned above, each of the respective first panel and second panel can include shoes 41S along their lower edges 41L and 42L. These shoes can rest and engage each of the respective front roller bearings 54 and rear roller bearings 56. Thus, the panels can be fully supported on these roller bearings. With the panels supported on the roller bearings, any dust or debris that collects in the door track 53 typically ends up on the bottom 53B and does not interfere with the opening and closing functions of the panels because that dust and debris is distal from the panels and bearings. With the roller bearings, the transparent closure system also can be less complex because the panels roll on the bearings and there are less parts that can be damaged and cease functioning over time.

With reference to FIGS. 14-16, the support block 55 can define multiple pin apertures 55A. Pins 55P can be disposed through the pin apertures 55A or otherwise secured or attached to the support block. The respective roller bearings 54 and 56 can be mounted on the respective pins, with the front roller bearing 54 mounted on a portion of a pin 55P extending from the front of the support block 55 in the front track, and the rear roller bearing 56 mounted on the portion of the pin 55P extending from the rear of the support block 55 in the rear track. This can minimize the number of axles or pins supporting the respective front and rear roller bearings. Of course, in other applications, the roller bearings can be mounted to the support block via threaded fasteners or other posts or elements. The respective front roller bearings 54 can be mounted in the front door track 55F, while the rear roller bearings 56 can be mounted in the rear door track 55R. Each of the respective bearings can be rotatably disposed in the respective door tracks on the front and rear sides of the support block. Each of the respective bearings can be horizontally aligned along a horizontal common plane to adequately and consistently support each of the respective panels, and to provide consistent movement during opening and closing of those panels and the closure system in general.

With reference to FIGS. 15 and 16, the support block 55 can be mounted to a support base 55B which can be installed in the upwardly opening track 53. These two components can be welded to one another and then further fastened to the track channel. The roller bearings 54, 56 and pins 55P can be assembled and joined with the support block 55 before the support block and bass are disposed in the channel 53. This can ease assembly of the multiple roller bearings and the respective components to mount them to the block 55. The support block optionally can have a thickness T4 that can be substantially greater than the thickness T5 and T6 of the respective front wall 51 and rear wall 52 of the lower door track 50. In some cases, the thickness T4 optionally can be at least two times greater, at least five times greater or at least ten times greater that the thicknesses T5 and T6. As a result, the support block can provide support to the roller bearings and further strengthen the lower door track to prevent breach of the security case 10. Moreover, the support block can be less likely to bend or break during an attempted breaching action on the security case 10.

As shown in FIG. 16, the lower door track 50 can be optionally further reinforced to increase the security of the closure system 40 and ensure that the panels 41, 42 remain engaged with the lower door track 50 when an individual attempts to forcibly breach the security case and access the internal compartment C. For example, the rear wall 52 can extend upwardly, above the rear roller bearings 56 and above the lower edges 41L, 42L of the panels a distance D10. This distance D10 can be greater than the diameter of the roller bearings 54, 56 and can be greater than the height H3 of the front wall 51. Further, the door track 50 can include a secondary reinforcement element 58 which can be welded or fastened to the rear wall 52 of the door track. This element 58 can include one or more buttresses 58B extending between and upright 55U and a lower or base wall 58L. The buttresses 58B can be a triangular shape as shown, or can be of a square, rectangular or other polygonal shape, and can extend transverse and/or perpendicular to the upright and/or base wall. The lower wall 58L can define an aperture and can have a fastener extend through it as shown. The base and buttress 58B can be fastened with the fastener 58F to the base deck 102 and the base 101. This additional reinforcing element 58 can withstand substantial forces exerted on the lower portion of the panels 41, 42 as well as forces on the door track 50 itself to impair or prevent the transparent closure from being breached, for example, by a looter trying to kick in the panels toward the internal compartment C and gain access to products on the shelves S1 and S2.

An alternative embodiment of the display case is shown in FIGS. 17-22 and designated 110. This display case can be similar or identical to the display case 10 of the current embodiment above in structure, function and operation with a few exceptions. For example, this security case 110 can include a transparent closure system 140 identical to the system 40 described above. This security case 110 also can include an adjustable depth system 120 similar or identical to the system 20 described above. As part of this system 120, however, the side panels, for example side panel 121 can include a height adjustment panel 125. This height adjustment panel 125 can include an upright wall 126 and a lower flange 127 that is transverse and/or perpendicular to the upright wall 126. The upright wall 126 can define substantially vertical slots 126S. The side panel 121 can define apertures 121H. Fasteners 125F can extend through the slots 126S and through the holes 121H. One or more nuts can be joined with respective fasteners 125F to secure the upright wall 126 to the side panel 121. By sliding the height adjustable panel 125 up-and-down relative to the side panel, optionally with the slots 126S moving relative to the fasteners 125 extending through and fixed relative to the side panel 121 via the holes 121H, the lower flange 127 can be placed immediately adjacent the base deck 102 along the lower edge of the side panel 121. The fasteners 125F can be tightened and secured to fix the height adjustment panel 125 in place in a secured manner. Further optionally, the lower flange 127 can be fastened directly to the base deck 102 through apertures defined therein with additional fasteners.

This embodiment of the security case 110 can include a toe kick levelling system 80, also referred to as a levelling system. This levelling system 80 can be installed on the type of security case 110 as shown in FIGS. 17-22 just as easily as the security case 10 shown in FIGS. 1-17. Moreover, the levelling system can be installed in combination with any one or more of the adjustable depth system 20, the transparent closure system 40 and/or the door track 50 as described above. In other embodiments, the levelling system can be installed independent of these systems. For clarification, any one of the levelling system, adjustable depth system, transparent closure system and/or door track can be installed and used in connection with a particular security case, or all or a combination of these components and systems can be mixed and matched and used in a particular security case.

Figure 18:
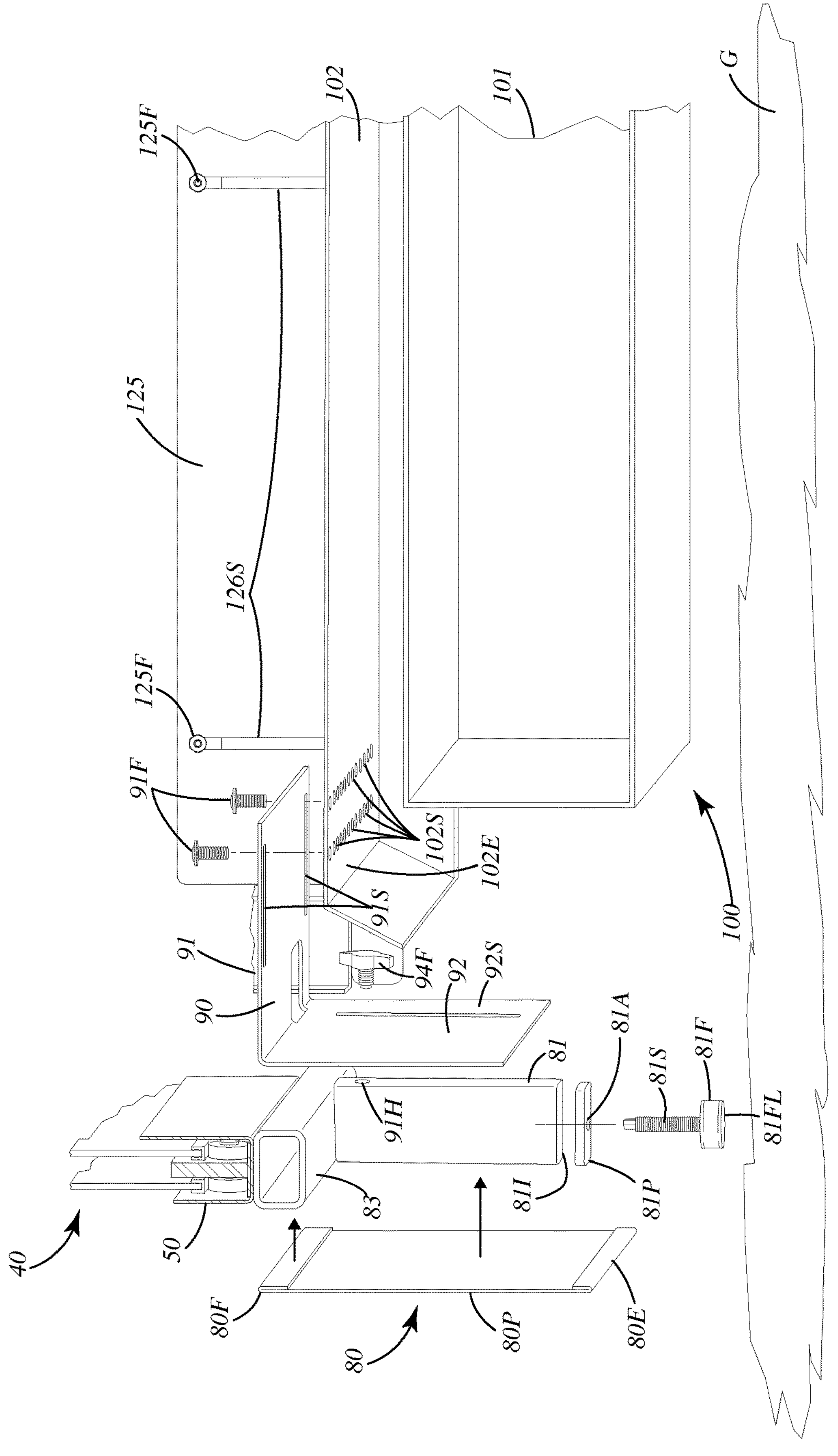
FIG. 18 is an exploded perspective view of the toe kick levelling system.

With reference to FIG. 18, the levelling system 80 can be secured directly to the base deck 102 which is secured to a base 101 which typically can be associated with a gondola 100 as described above. The gondola 100 and base 101 can be placed and supported by a ground surface G, which typically can be a concrete surface, sometimes covered with a floor covering. In general, the levelling system 80 can level the security case and its components, for example the front closure system, whether standard sliding doors or the transparent closure system 40 described above, relative to a horizontal plane HP (FIG. 22). This can allow levelling of the security case and toe kick panel 80P, as well as its lower edge 80E and/or upper edge 80F relative to the horizontal plane HP so that the toe kick and security case appear level to a consumer, increasing the overall appearance of the security case and conveying a professional installation in and construction of the security case.

In some cases, the gondola 100 to which the security case 110 is secured can be installed poorly and may not have a base deck 102 and/or base 101 that is level and/or aligned with the horizontal plane HP. With the levelling system 80 herein, the security case 110 or 10 can be leveled regardless of the poor installation and/or craftsmanship of the gondola. The levelling system also can install the security case level to the horizontal plane HP or any other surface or plane depending on the desired aesthetics or application.

Figure 20:
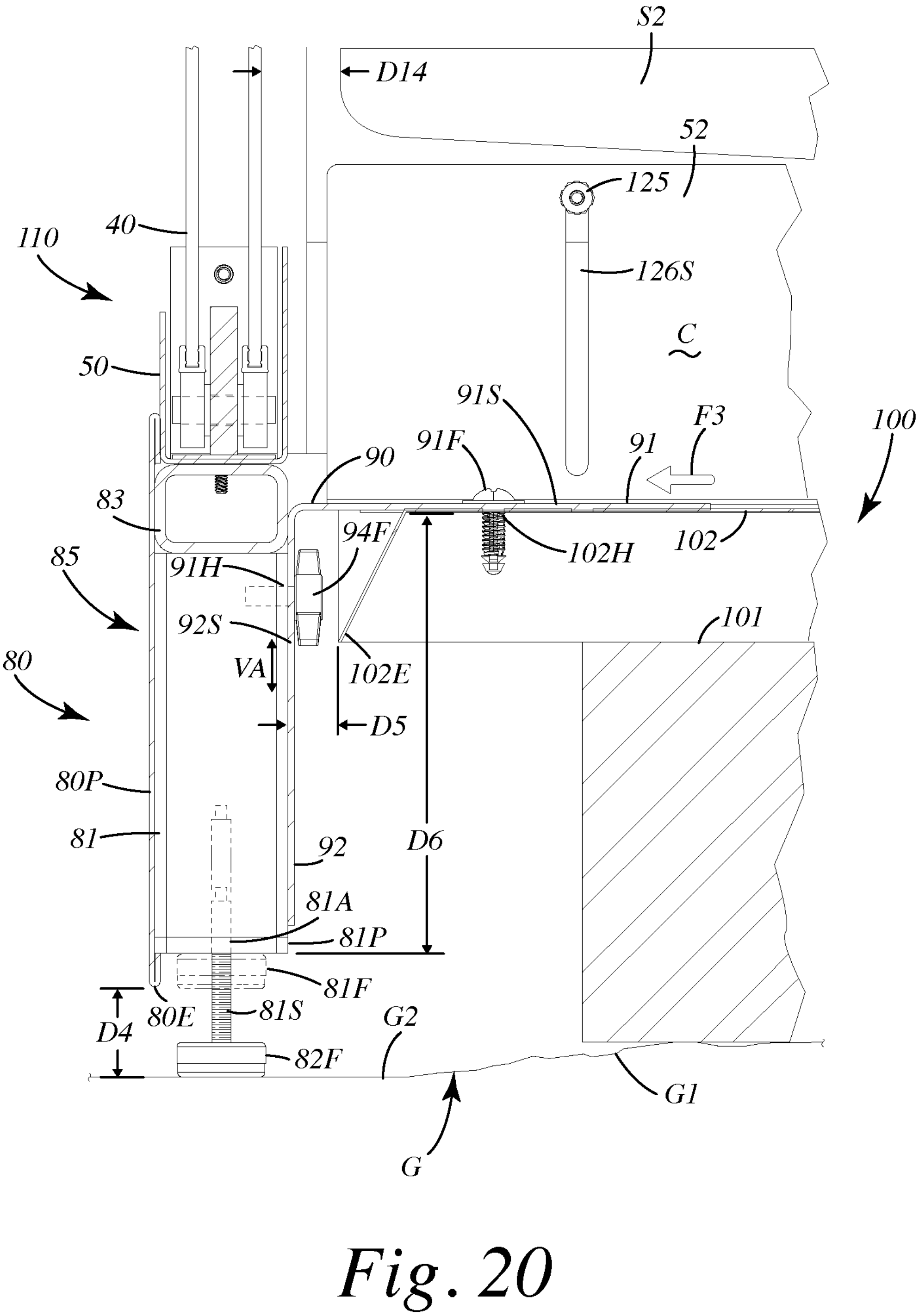
FIG. 20 is a partial section view of the toe kick levelling system showing a toe kick adjustably secured to a gondola base, with an adjustment support being moved to support the toe kick a fixed distance from a ground surface.

The levelling system 80 optionally can be outfitted with base bracket 90 that is configured for attachment and adjustment relative to many different types of gondolas of varying heights as described below. The levelling system 80 also can allow the proprietor of the retail store in which the security case 110 or 10 is installed to maximize merchandising capacity because the levelling system can be installed forward of the door track 50 and any transparent closure system 40 or other door system or tracks, in front of the gondola and/or base deck. Accordingly, as shown in FIG. 20, any shelves in the internal compartment, for example shelf S2, can clear the transparent closure system 40 or any other door system and/or the door track 50 or any other door track by a distance D15. This can eliminate any need to shorten or modify the shelves within the compartment to accommodate the security case 110 or 10 installed over and around the shelves to place them inside the internal compartment. Of course, in some applications, the shelves or components inside the internal compartment can be modified as desired.

The components of the levelling system 80 will now be described in further detail. As mentioned above, the levelling system 80 can include a toe kick panel 80P. This toe kick panel 80P can include an upper edge 80F and a lower opposing edge 80E. The toe kick panel 80P can serve as the aesthetic piece of the levelling system 80 facing outward into an aisle on which the gondola 100 is placed. It naturally draws the attention of a consumer or observer of the security case 110 and therefore can be aesthetically appealing, yet durable to withstand impact by shopping carts and cleaning equipment moving along the ground surface G. The toe kick panel 80P and its lower edge 80 can be the features that are levelled relative to the horizontal plane HP as they offer a noticeable reference for leveling.

Figure 17:
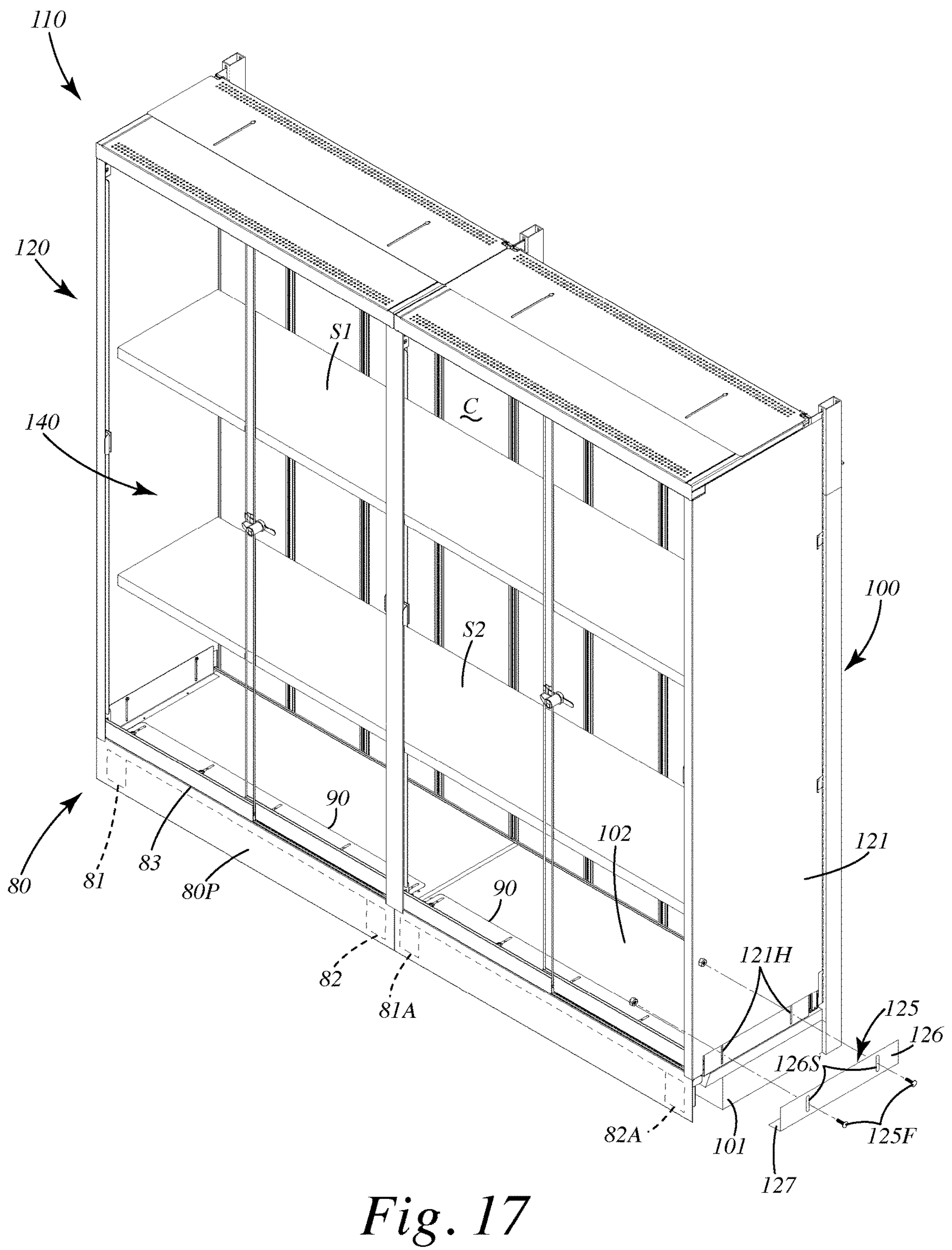
FIG. 17 is a perspective view of an alternative security case including a toe kick levelling system.

The toe kick panel 80P can be attached and joined with a support element 83, optionally in the form of a tube. The support element 83 can be a tubular hollow element as shown having a polygonal or other cross-section. This support element 83 can be rigid and relatively strong to support the door track 50 and the transparent closure system 40 (or any other door or track) above a ground surface G. The support element 83 can be mounted to a first adjustment support 81 and a second adjustment support 82, optionally disposed below the support element 83. Optionally, additional adjustment supports can be disposed between the ends of the support element. Further optionally, as shown in FIG. 17, the support element 83 can extend below multiple modular portions of the security case 110. In such an application, additional adjustment supports 81A and 82A can be disposed under the support element 83, collectively, and each of these adjustment supports can be adjusted to level the element 83, the door track 50, the transparent closure system 40, or any other door track or door system, as well as the security case 110 to the horizontal plane HP or some other plane depending on the application.

With further reference to FIG. 18, the support element 83 can be disposed below the door track 50, which can be the door track shown, or any other type of door track, such as a key slot door track, dual channel door track, single channel door track, a swinging door track, or other types of tracks or frames that hold, secure, hose, retain or otherwise engage a portion of the doors, panels or closures of the security case. The door track can be welded, fastened, or otherwise secured to the support element 83 so that the support element and track are rigidly and securely connected to one another. The support element 83 also optionally can extend under the doors or panels in the door track, for example, the transparent closure system 40 and its respective transparent panels. In some cases, the support element 83 can extend beyond the door track and/or transparent panels and be connected to respective uprights that frame the transparent closure system or other door system.

Figure 19:
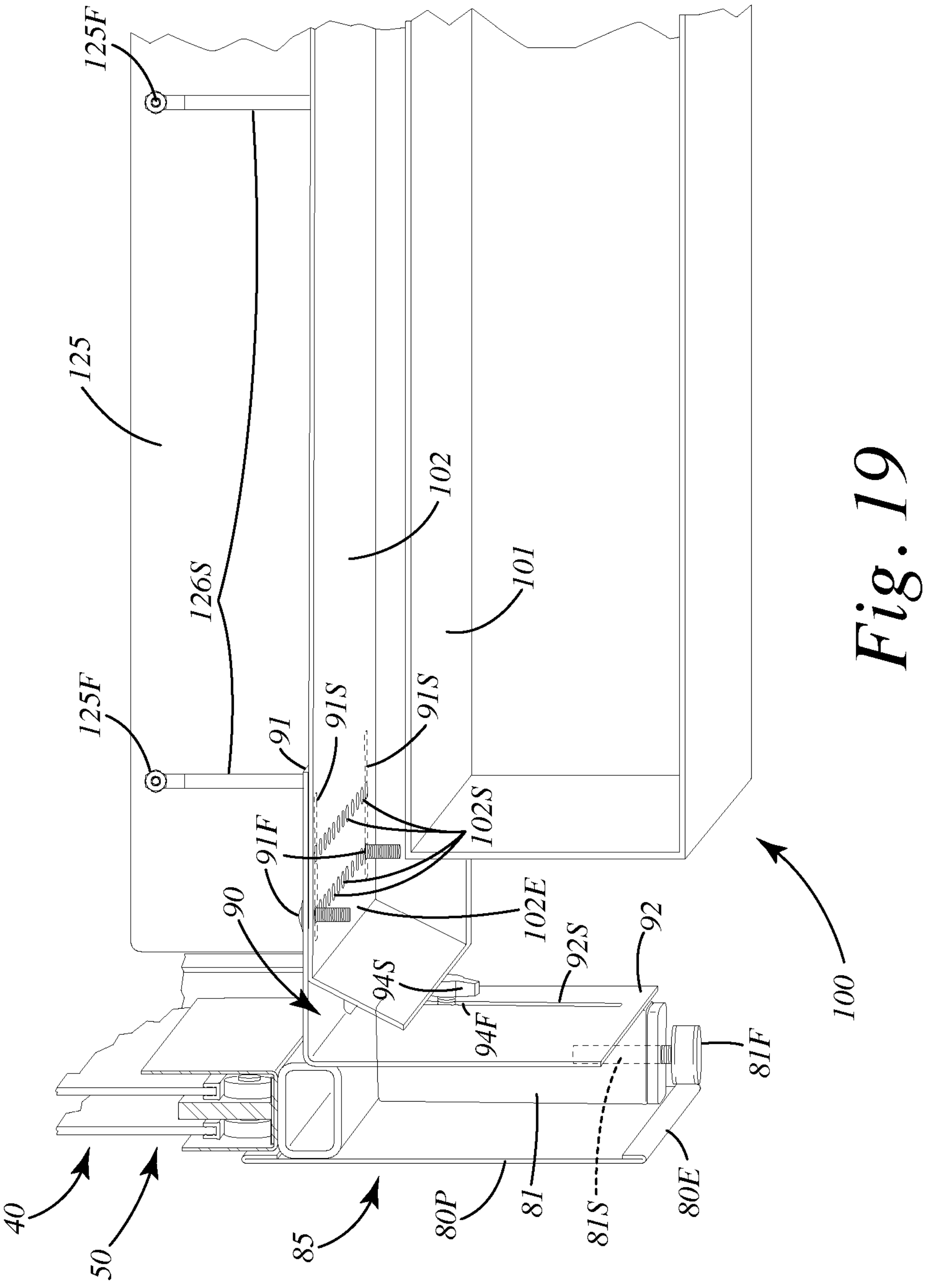
FIG. 19 is a perspective partial section view of toe kick levelling system with the toe kick bracket secured to the deck and the base of a gondola.
Figure 22:
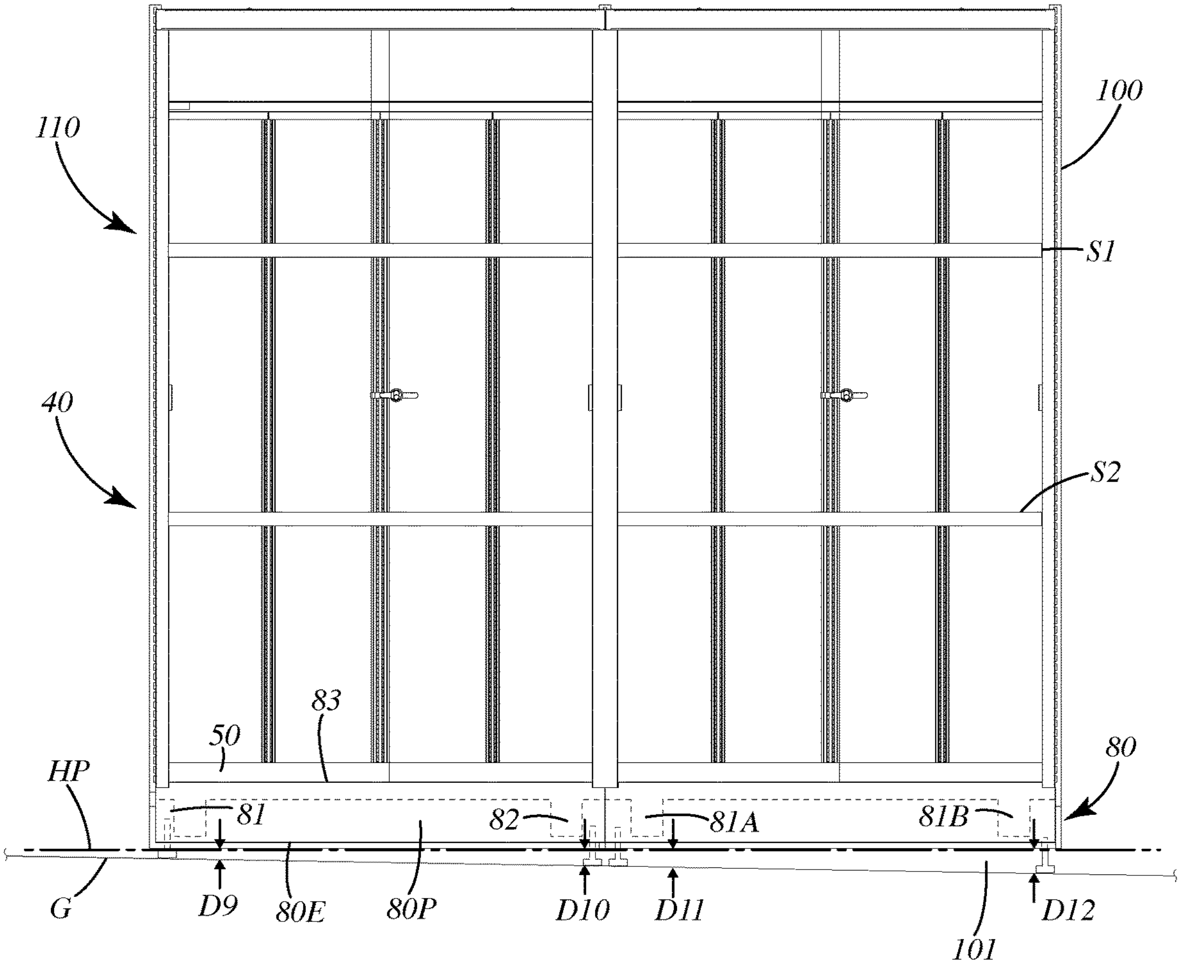
FIG. 22 is a front view of the security case with the toe kick levelling system used to level the security case relative to a horizontal plane despite an uneven, unlevel ground surface under the security case.

As mentioned above, the support element 83 can be joined with a first adjustment support 81 and a second adjustment support 82. As shown in FIGS. 18-19 and 22, the first adjustment support 81 can be welded, fastened or otherwise secured to the support element 83. The first adjustment support 81 can be substantially identical to the second adjustment support 82, therefore only the first adjustment support 81 will be described here. The first adjustment support 81 can extend downward from, generally transverse to and/or perpendicular to, the support element 83. The first adjustment support 81 can be in the form of a tubular member which optionally can be hollow. Of course, in other applications, the first adjustment support can be solid. A plate 81P can be secured to the lower end of the first adjustment support 81, opposite the upper end which is attached to the support element 83. The plate 81P can define an aperture 81A which optionally can be threaded and can open to the interior 811 of the adjustment support 81. The aperture 81A can be threaded to receive a shaft 81S which is joined with a first foot 81F. In some cases, the shaft 81S can rotate relative to the foot 81F. The shaft 81S can be selectively threaded into the aperture 81A, with a portion of the shaft 81 extending into the interior 811 of the first adjustment support 81, as shown in broken lines in FIG. 19.

The first foot 81F can be a round or cylindrical foot having a lower surface 81FL that is configured to directly contact the ground surface G when the foot is placed upon the ground. This shaft 81S can be threaded into and out from the aperture 81A and thus change the distance between the support element 83 and the lowermost surface 81FL of the first foot 81F. In so doing, the shaft and foot in the adjustment support can set the orientation and level of the support element 83 and thus the door track and any associated door system of the door track and the security case being generally supported by the support element 83.

An example of an adjustment to the adjustment support 81 is shown in FIG. 20. There, a base 101 of a gondola 100 is disposed on a first portion G1 of the ground surface G. The ground surface, however, is uneven and/or deformed at a second portion G1 of the ground surface G2, located under the first adjustment support 81. Thus, to support the levelling system 80 adequately, the shaft 81S can be threaded out of the aperture 81A such that the foot 81F is moved a distance D4 downward from the plate 81P. The shaft 81S can continue to be rotated out from the interior 811 of the adjustment support 81, with the shaft and foot moving downward until the foot 81F contacts the portion of the ground G2. If suitable, the shaft can continue to be threaded out of the plate and adjustment support to ultimately level the lower edge 80E of the toe kick panel 80P and thus level the track 50 and system 40 relative to the horizontal plane HP.

Another example of an adjustment to several adjustment supports 81, 82, 81A, 81B is shown in FIG. 22. There, the ground G is not level relative to a horizontal plane HP. As a result, the base 101 and portion of the gondola 100 may be unlevel relative to the horizontal plane. To ensure that the security case 110, closure 40, track 50 and/or the toe kick plate 80P appear and/or are level, aligned with and/or parallel to the horizontal plane HP, the respective adjustment supports 81, 82, 81A, 81B can be adjusted. Optionally, the foot and shaft of the adjustment support 81 can be extended a distance D9 from the lower edge 82E or some other reference point. The foot and the shaft of adjustment support 82 can be extended a distance D10 from the lower edge or some other reference point. The distance D10 can extend below the lower edge 80E a distance that is greater than the distance D9. As a result, the lower panel edge 80E can be level relative to the horizontal plane HP which in turn levels the remaining components of the display case 110 relative to the horizontal plane HP as well.

Further optionally, where included, the additional adjustment support 81A can be modified to extend the foot and shaft a distance D11 below the lower edge or some other reference point, while the other foot and shaft of the adjustment support 81B can be extended a distance D12 below the lower edge or some other reference point. The distances can become progressively greater from the distance D9 to the distance D12 to level the lower edge 80E relative to the horizontal plane HP or some other plane depending on the application. For example, it may be aesthetically more pleasing to level the lower edge to some other plane that is not perfectly horizontal to ensure the showcase matches its surroundings. In other applications, the ground may be uneven across the base 101. For example, it may slope downward and then upward from the first adjustment support 81 to the other adjustment support 81B. In this case, each of the respective adjustment supports can be adjusted different amounts to level the toe kick 80, the panel 80P and/or the lower edge 80E and thus the other components of the security case 110 relative to the horizontal plane or some other reference plane.

The toe kick levelling system 80 optionally can include a toe kick bracket 90 as shown in FIGS. 18-21. This toe kick bracket 90 can include a first leg 91 and a second leg 92 transverse and optionally perpendicular to one another. This toe kick bracket can be used to connect and orient the toe kick unit 85, which can include the support element 83, the toe kick panel 80P and the adjustment supports 81, 82, relative to the base deck 102 and base 101. With this bracket 90, the unit 85 can be adjusted and oriented easily relative to many different gondolas having different structures as well as many different base deck heights to well position the toe kick plate and its components relative to the floor and to the base deck. For example, the bracket can allow vertical and horizontal adjustment of the unit 85 as well as the door track and any associated doors relative to the base deck and the base.

To provide adjustment, the first leg 91 and the second leg 92 can each include one or more holes or slots to accommodate fasteners or attachment devices in different locations, thereby allowing the bracket to connect and be attached to the base and to the toe kick unit in different orientations. As an example, shown in FIGS. 18-19, the adjustment bracket 90 can include the first leg 91 and the second leg 92. The first leg 91 can include one or more first leg slots 91S. These first leg slots 91S can be aligned with certain ones of holes 102S as defined in the deck base 102, along its front edge 102E. One or more first leg fasteners 91F can be extended through the slots 91S and into respective ones of the holes 102S in the base deck and tightened to secure the first leg 91 in a fixed orientation and position relative to the base deck 102. The first fastener moved in or relative to the first slot or vice versa can provide horizontal adjustment to the toe kick, the toe kick unit and components thereof or other items such as a door track and door attached thereto. Although not shown, the fasteners 91F can include nuts that can further assist in securing the fasteners in the bracket in a fixed relation relative to the deck base 102. Of course, although shown as slots, the first and second legs can be outfitted with an array of holes or apertures or recesses that allow fasteners to extend therethrough or through the legs for securement to some other component.

As shown in FIGS. 18 and 19, the second leg 92 can include one or more second leg slots 92S. These second leg slots 92S can be aligned with support holes 91H that are defined by the adjustment supports 81, 82, etc. The adjustment holes 91H can be disposed in a fixed location along the height of the adjustment support 81. One or more second leg fasteners 94F can be extended through the slot 92S and into the support hole 91H as defined in the adjustment support 81 to secure the second leg 92 in a fixed orientation and location relative to the adjustment support 81 and thus to the toe unit 85. Likewise, the toe kick unit 85 can be fixedly secured to the toe kick bracket 90 in a fixed orientation due to the attachment via the second leg fastener 94F positioned in the second slot 92S and subsequently tightened to clamp against the second leg. The second fastener moved in or relative to the second slot or vice versa can provide vertical adjustment to the toe kick, the toe kick unit and components thereof or other items such as a door track and door attached thereto. As will be appreciated, due to the configuration of the slot 92S, the second leg fastener 94F and its shaft 94S can be moved along the slot 92S in directions VA in FIG. 20 or vice versa to effectively set distance of the lower edge 80E of the toe kick unit 85, the toe kick itself and/or the toe kick panel

80P relative to the ground surface G or some other surface or relative to the base deck 102, generally adjusting these components vertically.

Figure 21:
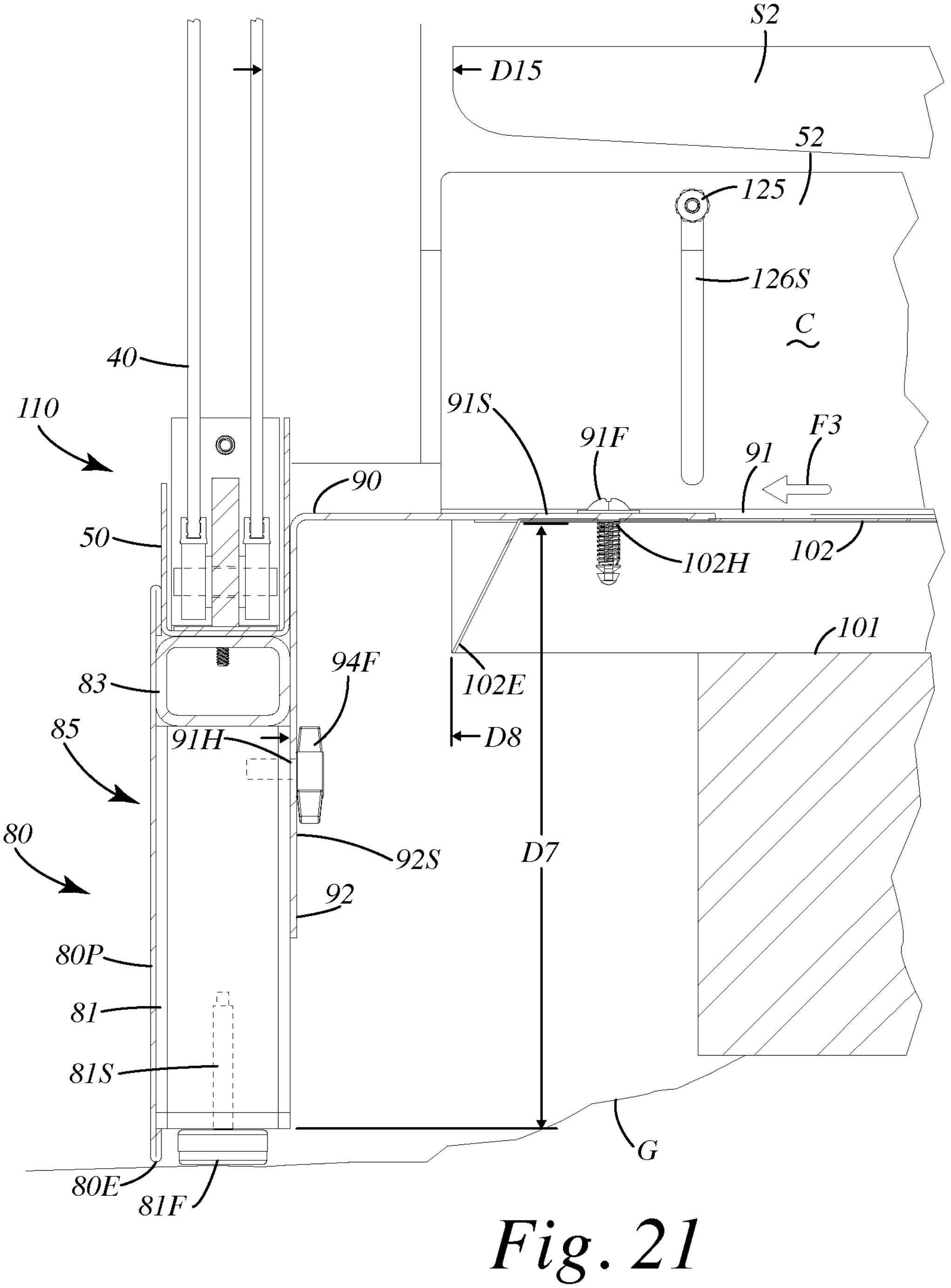
FIG. 21 is a section view of the toe kick levelling system showing a toe kick adjustably secured to a gondola base, with a toe kick bracket adjusted to set the toe kick a particular distance from the base in vertical and horizontal directions.

As a further example of the adjustment provided by the toe kick base bracket 90, reference is made to FIGS. 20 and 21. In FIG. 20, the bracket 90 can be secured to the base deck 102 with a first leg fastener 91F. The first leg fastener 91F can project through the elongated slot 91S that is generally perpendicular to the toe kick unit 85. The first leg fastener 91F can be secured to the base deck 102 and thorough base deck hole 102H. The second leg fastener 94F can project through the elongated slot 92S which can be oriented generally vertically and perpendicular to the lower edge 80E. The second leg fastener 94F can be secured to the adjustment support 81 and through the support hole 81H.

In FIG. 20, the plate 81P and the lowermost portion of the adjustment support 81 can be disposed a distance D6 below the base deck 102. The adjustment support 81 as well as the second leg 92 can be disposed a distance D5 horizontally from the forward edge 102E of the base deck 102. This configuration however may not be suitable for the toe kick plate unit 85, the door track and/or the doors. A user may want to alter the orientation and spacing of the toe kick unit 85 relative to the base 101 of the gondola 100 and/or the ground G, moving it vertically, horizontally and/or in other spatial directions. To do so, a user can loosen the first leg fastener 91F and move or slide the first bracket 91 in a direction F3 along the base 102. After the distance D5 is changed to a new distance D8 as shown in FIG. 21, the user can retighten the first leg fastener 91F to fix the bracket relative to the base 102. The user also or alternatively can loosen the second leg fastener 94F such that the bracket 90 and the toe kick unit 85 are loosened relative to one another. The user can move the toe kick unit 85 and its components up and/or down. If moved down, the distance D6 in FIG. 20 can increase to a greater distance D7 as shown in FIG. 21 thereby lowering the toe kick unit, doors and door track downward. Of course, these movements can be reversed or performed various combinations to use the bracket to reorient the toe kick unit 85 and the toe kick panel or plate 80P in a variety of different locations, as is appropriate for the aesthetics of the gondola 100, the ground G and/or the security case 110. It also will be appreciated that vertical movement of the toe kick unit via the bracket along with the with the adjustment supports in combination can be used to level and/or reorient the toe kick unit relative to the horizontal plane HP or some other reference plane.

It will be appreciated that the various channel members and uprights described in connection with the transparent closure system 40 can be constructed from a rigid material having a high-strength and resistance to excessive loads so that these components can impair and/or prevent the transparent panels herein from being bent inward into the internal compartment and/or off the door tracks so the internal compartment can be breached. The material from which the channel members and uprights are constructed can be a metal, such as steel, aluminum, and alloy, or a composite, or combinations of the foregoing. Generally, the material can be less prone to bending or yielding than the material from which the transparent panels are constructed.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

Reference throughout this specification to "a current embodiment" or "an embodiment" or "alternative embodiment" means that a particular feature, structure, or characteristic described in connection with the embodiment is included in at least one embodiment herein. Accordingly, the appearance of the phrases "in one embodiment" or "in an embodiment" or "in an alternative embodiment" in various places throughout this specification are not necessarily all referring to the same embodiment. Furthermore, the particular features, structures, or characteristics may be combined in any suitable manner in one or more embodiments.

What is claimed is:

1. A security case comprising:

a top panel, a first side panel including a first upper edge adjacent the top panel, a first lower edge below the first upper edge, a first front edge, a first rear edge rearward of the first front edge and a first upright, adjacent the first rear edge, the first side panel defining a plurality of first upper slots being vertically oriented and parallel to one another and disposed downward from the first upper edge, the plurality of first upper slots being oriented parallel to the first front edge and the first rear edge of the first side panel, the first side panel defining a plurality of first lower slots being vertically oriented and parallel to one another, and below the plurality of first upper slots;

a first flip bracket having a first pronged finger configured to fit in a corresponding first rack slot of a gondola upright of a gondola to which the security case is joined, the first flip bracket being fastened to the first upright with a first fastener extending through the first side panel;

a second flip bracket located vertically downward from the first flip bracket, the second flip bracket having a second pronged finger configured to fit in a corresponding second rack slot of the gondola upright, the second flip bracket being fastened to the first upright with a second fastener extending through the first side panel;

a second side panel disposed adjacent the first side panel, the second side panel including a second upper edge adjacent the top panel, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with one of the first upper slots, the second lower slot being selectively alignable with one of the first lower slots;

a first fastener positionable through one of the first upper slots and the second upper slot to fix a first depth of the first rear edge to the second front edge to accommodate a first shelf depth of a first shelf extending from the gondola upright; and a second fastener selectively positionable through one of the first lower slots and the second lower slot to fix the first depth of the first rear edge to the second front edge, whereby the first fastener and the second fastener are repositionable through another of the plurality of first upper slots and another of the plurality of first lower slots to fix a different depth of the first rear edge to the second front edge and thereby accommodate a second shelf depth different from the first shelf depth, wherein the top panel includes an upper interior panel and an upper exterior panel telescopingly arranged relative to one another to accommodate the first depth of the first shelf, wherein the top panel includes a top panel flange, wherein at least one of the first side panel and the second side panel includes an upper side panel flange, wherein the top panel flange is fastened to the upper side panel flange to secure the top panel to the first side panel and the second side panel in a fixed manner, wherein the first side panel, the second side panel and the top panel bound at least a portion of an internal compartment.

2. The security case of claim 1, wherein the first side panel includes a connector tab adjacent to the first lower edge, the connector tab defining a connector tab fastener hole, wherein a connector tab fastener is positionable through the connector tab fastener hole to secure the first side panel to a base of the gondola in a fixed manner.

3. The security case of claim 1, comprising:

a third panel including a third upper edge and a fourth panel including a fourth upper edge, the third panel and the fourth panel bounding an opposite side of the at least a portion of the internal compartment from the first side panel and the second side panel, the third panel and the fourth side panel joined in a telescoping manner with one another and joined with the gondola upright via at least one third flip bracket, wherein the upper interior panel and the upper exterior panel of the top panel are unattached to the gondola upright, wherein the upper interior panel and the upper exterior panel of the top panel are fixedly attached to the respective first upper edge, the second upper edge, the third upper edge and the fourth upper edge.

4. The security case of claim 1, comprising:

a door track including an upwardly opening track channel;

a support block disposed in the track channel and separating the track channel into a front door track and a rear door track, the support block defining a plurality of pin apertures;

a plurality of pins disposed through respective ones of the plurality of pin apertures;

a plurality of roller bearings mounted to respective ones of the plurality of pins, such that a first roller bearing is rotatably disposed in the front door track on a front side of the support block and a second roller is rotatably disposed in the rear forward door track on a rear side of the support block, wherein the plurality of roller bearings are configured to support at least one door thereon.

5. A security case comprising:

a top panel, a first side panel including a first upper edge adjacent the top panel, a first lower edge below the first upper edge, a first front edge, a first rear edge rearward of the first front edge and a first upright, adjacent the first rear edge, the first side panel defining a plurality of first upper slots being vertically oriented and parallel to one another and disposed downward from the first upper edge, the plurality of first upper slots being oriented parallel to the first front edge and the first rear edge of the first side panel, the first side panel defining a plurality of first lower slots being vertically oriented and parallel to one another, and below the plurality of first upper slots;

a first flip bracket having a first pronged finger configured to fit in a corresponding first rack slot of a gondola upright of a gondola to which the security case is joined, the first flip bracket being fastened to the first upright with a first fastener extending through the first side panel;

a second flip bracket located vertically downward from the first flip bracket, the second flip bracket having a second pronged finger configured to fit in a corresponding second rack slot of the gondola upright, the second flip bracket being fastened to the first upright with a second fastener extending through the first side panel;

a second side panel disposed adjacent the first side panel, the second side panel including a second upper edge adjacent the top panel, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with one of the first upper slots, the second lower slot being selectively alignable with one of the first lower slots;

a first fastener positionable through one of the first upper slots and the second upper slot to fix a first depth of the first rear edge to the second front edge to accommodate a first shelf depth of a first shelf extending from the gondola upright; and a second fastener selectively positionable through one of the first lower slots and the second lower slot to fix the first depth of the first rear edge to the second front edge, whereby the first fastener and the second fastener are repositionable through another of the plurality of first upper slots and another of the plurality of first lower slots to fix a different depth of the first rear edge to the second front edge and thereby accommodate a second shelf depth different from the first shelf depth, wherein the first side panel is interior to the second side panel relative to at least a portion of an internal compartment bounded by the first side panel, the second side panel and the top panel, wherein the first side panel includes a first shoulder adjacent the first side panel upright, wherein the first shoulder is between the first rear edge and the plurality of first upper slots, wherein the first shoulder transitions to a first side panel outer surface that is flush with a second side panel outer surface of the second side panel.

6. A security case comprising:

a top panel, a first side panel including a first upper edge adjacent the top panel, a first lower edge below the first upper edge, a first front edge, a first rear edge rearward of the first front edge and a first upright, adjacent the first rear edge, the first side panel defining a plurality of first upper slots being vertically oriented and parallel to one another and disposed downward from the first upper edge, the plurality of first upper slots being oriented parallel to the first front edge and the first rear edge of the first side panel, the first side panel defining a plurality of first lower slots being vertically oriented and parallel to one another, and below the plurality of first upper slots;

a first flip bracket having a first pronged finger configured to fit in a corresponding first rack slot of a gondola upright of a gondola to which the security case is joined, the first flip bracket being fastened to the first upright with a first fastener extending through the first side panel;

a second flip bracket located vertically downward from the first flip bracket, the second flip bracket having a second pronged finger configured to fit in a corresponding second rack slot of the gondola upright, the second flip bracket being fastened to the first upright with a second fastener extending through the first side panel;

a second side panel disposed adjacent the first side panel, the second side panel including a second upper edge adjacent the top panel, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with one of the first upper slots, the second lower slot being selectively alignable with one of the first lower slots;

a first fastener positionable through one of the first upper slots and the second upper slot to fix a first depth of the first rear edge to the second front edge to accommodate a first shelf depth of a first shelf extending from the gondola upright;

a second fastener selectively positionable through one of the first lower slots and the second lower slot to fix the first depth of the first rear edge to the second front edge;

a door track; and a transparent closure disposed in the door track so a viewer can view through the transparent closure to the first shelf, the transparent closure comprising:

a polycarbonate first transparent panel moveably disposed adjacent the first side panel and the second side panel and including a first panel lateral edge and a second panel lateral edge opposite the first panel lateral edge, the first transparent panel defining a plurality of first panel holes adjacent the first panel lateral edge and a plurality of second panel holes adjacent the second panel lateral edge;

a first channel member overlapping the first panel lateral edge and defining a plurality of first channel holes aligned with the plurality of first panel holes;

a second channel member overlapping the second panel lateral edge and defining a plurality of second channel holes aligned with the plurality of second panel holes; and a plurality of first panel fasteners extending through respective ones of the plurality of first channel holes and the plurality of second channel holes to secure the first channel member and the second channel member to the polycarbonate first transparent panel, whereby the first channel member and the second channel member provide rigidity to the polycarbonate first transparent panel to impair the first transparent panel from bending inward into an internal compartment at least partially bounded by the top panel, the first side panel and the second side panel when a force is applied toward the internal compartment, whereby the first fastener and the second fastener are repositionable through another of the plurality of first upper slots and another of the plurality of first lower slots to fix a different depth of the first rear edge to the second front edge and thereby accommodate a second shelf depth different from the first shelf depth.

7. The security case of claim 6, wherein the first channel member includes a first channel wall, a second channel wall and a connecting wall extending between the first channel wall and the second wall, wherein the first channel wall, the second channel wall and the connecting wall form a U shape, wherein the first transparent panel includes an exterior surface and an interior surface, wherein the first channel wall faces toward the exterior surface, wherein the second channel wall faces toward the interior surface.

8. The security case of claim 7, wherein the first channel wall is parallel to the exterior surface, wherein the second channel wall is offset at an acute angle relative to the interior surface.

9. The security case of claim 8, wherein the transparent closure comprises:

a polycarbonate second transparent panel moveably disposed adjacent the first transparent panel and including a third panel lateral edge and a fourth panel lateral edge opposite the third panel lateral edge, the second transparent panel defining a plurality of third panel holes adjacent the third panel lateral edge and a plurality of fourth panel holes adjacent the fourth panel lateral edge;

a third channel member overlapping the third panel lateral edge and defining a plurality of third channel holes aligned with the plurality of third panel holes;

a fourth channel member overlapping the fourth panel lateral edge and defining a plurality of fourth channel holes aligned with the plurality of fourth panel holes; and a plurality of third panel fasteners extending through respective ones of the plurality of third channel holes and the plurality of fourth channel holes to secure the third channel member and the fourth channel member to the polycarbonate second transparent panel, whereby the third channel member and the fourth channel member provide rigidity to the polycarbonate second transparent panel to impair the second transparent panel from bending inward into the at least a portion of the internal compartment when a force is applied toward the at least a portion of the internal compartment.

10. A security case comprising:

a top panel, a first side panel including a first upper edge adjacent the top panel, a first lower edge below the first upper edge, a first front edge, a first rear edge rearward of the first front edge and a first upright, adjacent the first rear edge, the first side panel defining a plurality of first upper slots being vertically oriented and parallel to one another and disposed downward from the first upper edge, the plurality of first upper slots being oriented parallel to the first front edge and the first rear edge of the first side panel, the first side panel defining a plurality of first lower slots being vertically oriented and parallel to one another, and below the plurality of first upper slots;

a first flip bracket having a first pronged finger configured to fit in a corresponding first rack slot of a gondola upright of a gondola to which the security case is joined, the first flip bracket being fastened to the first upright with a first fastener extending through the first side panel;

a second flip bracket located vertically downward from the first flip bracket, the second flip bracket having a second pronged finger configured to fit in a corresponding second rack slot of the gondola upright, the second flip bracket being fastened to the first upright with a second fastener extending through the first side panel;

a second side panel disposed adjacent the first side panel, the second side panel including a second upper edge adjacent the top panel, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with one of the first upper slots, the second lower slot being selectively alignable with one of the first lower slots;

a first fastener positionable through one of the first upper slots and the second upper slot to fix a first depth of the first rear edge to the second front edge to accommodate a first shelf depth of a first shelf extending from the gondola upright;

a second fastener selectively positionable through one of the first lower slots and the second lower slot to fix the first depth of the first rear edge to the second front edge;

a door track; and a transparent closure disposed in the door track so a viewer can view through the transparent closure to the first shelf, the transparent closure comprising:

a polycarbonate first transparent panel moveably joined with the door track;

a polycarbonate second transparent panel moveably joined with the door track and outwardly disposed relative to the first transparent panel, wherein each of the first transparent panel and the second transparent panel are reinforced along a respective lateral edge with a respective channel member that extends adjacent the respective lateral edge, wherein a plurality of fasteners extend through a plurality of holes defined through the respective lateral edge and the respective channel member to secure the respective channel member to the respective lateral edge, whereby the first fastener and the second fastener are repositionable through another of the plurality of first upper slots and another of the plurality of first lower slots to fix a different depth of the first rear edge to the second front edge and thereby accommodate a second shelf depth different from the first shelf depth.

11. A security case comprising:

a top panel, a first side panel including a first upper edge adjacent the top panel, a first lower edge below the first upper edge, a first front edge, a first rear edge rearward of the first front edge and a first upright, adjacent the first rear edge, the first side panel defining a plurality of first upper slots being vertically oriented and parallel to one another and disposed downward from the first upper edge, the plurality of first upper slots being oriented parallel to the first front edge and the first rear edge of the first side panel, the first side panel defining a plurality of first lower slots being vertically oriented and parallel to one another, and below the plurality of first upper slots;

a first flip bracket having a first pronged finger configured to fit in a corresponding first rack slot of a gondola upright of a gondola to which the security case is joined, the first flip bracket being fastened to the first upright with a first fastener extending through the first side panel;

a second flip bracket located vertically downward from the first flip bracket, the second flip bracket having a second pronged finger configured to fit in a corresponding second rack slot of the gondola upright, the second flip bracket being fastened to the first upright with a second fastener extending through the first side panel;

a second side panel disposed adjacent the first side panel, the second side panel including a second upper edge adjacent the top panel, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with one of the first upper slots, the second lower slot being selectively alignable with one of the first lower slots;

a first fastener positionable through one of the first upper slots and the second upper slot to fix a first depth of the first rear edge to the second front edge to accommodate a first shelf depth of a first shelf extending from the gondola upright;

a second fastener selectively positionable through one of the first lower slots and the second lower slot to fix the first depth of the first rear edge to the second front edge;

a door track, the door track including an upwardly opening track channel;

a toe kick joined with the door track and disposed under the upwardly opening track channel, the toe kick including a toe kick lower edge;

a first adjustment support including a first threaded aperture and a first threaded shaft therein, the first threaded shaft joined with a first foot, the first adjustment support joined with the toe kick; and a second adjustment support including a second threaded aperture and a second threaded shaft therein, the second threaded shaft joined with a second foot, the second adjustment support joined with the toe kick distal from the first adjustment support, wherein the first and second adjustment supports are selectively adjustable to level the toe kick lower edge relative to a horizontal plane, whereby the door track is leveled relative to the horizontal plane, whereby the first fastener and the second fastener are repositionable through another of the plurality of first upper slots and another of the plurality of first lower slots to fix a different depth of the first rear edge to the second front edge and thereby accommodate a second shelf depth different from the first shelf depth.

12. A security case comprising:

a first side panel including a first upper edge adjacent the top panel, a first lower edge below the first upper edge, a first front edge, a first rear edge rearward of the first front edge, the first side panel defining a plurality of vertically oriented first upper slots disposed downward from the first upper edge, the plurality of first upper slots being vertically oriented and parallel to one another, and the first front edge and the first rear edge of the first side panel, the first side panel defining a plurality of first lower slots vertically oriented and parallel to one another;

a second side panel disposed adjacent the first side panel, the second side panel including a second upper edge, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with a first upper slot of the plurality of first upper slots, the second lower slot being selectively alignable with a first lower slot of the plurality of first lower slots, at least one of the first side panel and second side panel configured to join with a gondola upright of a gondola;

a first fastener selectively positionable through the first upper slot and the second upper slot to fix a first depth of the first rear edge to the second front edge to accommodate a first shelf depth of a first shelf extending from the gondola upright;

a second fastener selectively positionable through the first lower slot and the second lower slot to fix the first depth of the first rear edge to the second front edge; and a first top panel and a second top panel that are telescopingly joined with one another so that a top panel depth of the top panel can be selectively adjusted to correspond to the first depth to accommodate the first shelf depth of the first shelf extending from the gondola upright of the gondola to which the security case is mounted, the first top panel, the second top panel, the first side panel and the second side panel bounding at least a portion of an internal compartment;

a polycarbonate first transparent panel moveable relative to the internal compartment to gain access thereto;

a polycarbonate second transparent panel moveable relative to the internal compartment and the first transparent panel, the second transparent panel outwardly disposed relative to the first transparent panel, whereby the first fastener and the second fastener are selectively repositionable through another of the plurality of first upper slots and another of the plurality of first lower slots to fix a different depth of the first rear edge to the second front edge and thereby accommodate a second shelf depth different from the first shelf depth, wherein each of the first transparent panel and the second transparent panel are reinforced along a respective lateral edge with a respective channel member that extends adjacent the respective lateral edge, wherein a plurality of panel fasteners extend through a plurality of holes defined through the respective lateral edge and the respective channel member to secure the respective channel member to the respective lateral edge.

13. A security case comprising:

a first side panel including a first upper edge adjacent the top panel, a first lower edge below the first upper edge, a first front edge, a first rear edge rearward of the first front edge, the first side panel defining a plurality of vertically oriented first upper slots disposed downward from the first upper edge, the plurality of first upper slots being vertically oriented and parallel to one another, and the first front edge and the first rear edge of the first side panel, the first side panel defining a plurality of first lower slots vertically oriented and parallel to one another;

a second side panel disposed adjacent the first side panel, the second side panel including a second upper edge, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with a first upper slot of the plurality of first upper slots, the second lower slot being selectively alignable with a first lower slot of the plurality of first lower slots, at least one of the first side panel and second side panel configured to join with a gondola upright of a gondola;

a first fastener selectively positionable through the first upper slot and the second upper slot to fix a first depth of the first rear edge to the second front edge to accommodate a first shelf depth of a first shelf extending from the gondola upright;

a second fastener selectively positionable through the first lower slot and the second lower slot to fix the first depth of the first rear edge to the second front edge;

a first top panel and a second top panel that are telescopingly joined with one another so that a top panel depth of the top panel can be selectively adjusted to correspond to the first depth to accommodate the first shelf depth of the first shelf extending from the gondola upright of the gondola to which the security case is mounted;

a door track including an upwardly opening track channel;

a toe kick joined with the door track and disposed under the upwardly opening track channel, the toe kick including a toe kick lower edge;

a first adjustment support including a first threaded aperture and a first threaded shaft therein, the first threaded shaft joined with a first foot, the first adjustment support joined with the toe kick; and a second adjustment support including a second threaded aperture and a second threaded shaft therein, the second threaded shaft joined with a second foot, the second adjustment support joined with the toe kick distal from the first adjustment support, wherein the first and second adjustment supports are selectively adjustable to level the toe kick lower edge relative to a horizontal plane, whereby the door track is leveled relative to the horizontal plane, whereby the first fastener and the second fastener are selectively repositionable through another of the plurality of first upper slots and another of the plurality of first lower slots to fix a different depth of the first rear edge to the second front edge and thereby accommodate a second shelf depth different from the first shelf depth.

14. A security case comprising:

a first side panel including a first upper edge adjacent the top panel, a first lower edge below the first upper edge, a first front edge, a first rear edge rearward of the first front edge, the first side panel defining a plurality of vertically oriented first upper slots disposed downward from the first upper edge, the plurality of first upper slots being vertically oriented and parallel to one another, and the first front edge and the first rear edge of the first side panel, the first side panel defining a plurality of first lower slots vertically oriented and parallel to one another;

a second side panel disposed adjacent the first side panel, the second side panel including a second upper edge, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second upper slot being vertically oriented below the second upper edge and a second lower slot being vertically oriented below the second upper slot, closer to the second lower edge than the second upper slot, the second upper slot being selectively alignable with a first upper slot of the plurality of first upper slots, the second lower slot being selectively alignable with a first lower slot of the plurality of first lower slots, at least one of the first side panel and second side panel configured to join with a gondola upright of a gondola;

a first fastener selectively positionable through the first upper slot and the second upper slot to fix a first depth of the first rear edge to the second front edge to accommodate a first shelf depth of a first shelf extending from the gondola upright;

a second fastener selectively positionable through the first lower slot and the second lower slot to fix the first depth of the first rear edge to the second front edge;

a first top panel and a second top panel that are telescopingly joined with one another so that a top panel depth of the top panel can be selectively adjusted to correspond to the first depth to accommodate the first shelf depth of the first shelf extending from the gondola upright of the gondola to which the security case is mounted;

a door track including an upwardly opening track channel;

a toe kick joined with the door track and disposed under the upwardly opening track channel, the toe kick including a toe kick lower edge;

a first adjustment support including a first threaded aperture and a first threaded shaft therein, the first threaded shaft joined with a first foot, the first adjustment support joined with the toe kick; and a second adjustment support including a second threaded aperture and a second threaded shaft therein, the second threaded shaft joined with a second foot, the second adjustment support joined with the toe kick distal from the first adjustment support, wherein the first and second adjustment supports are selectively adjustable to level the toe kick lower edge relative to a horizontal plane, whereby the door track is leveled relative to the horizontal plane, a toe kick bracket including a first leg and a second leg transverse to one another, the first leg including a first leg slot, the second leg including a second leg slot;

a first leg fastener disposed in the first leg slot to join the toe kick with the first leg; and a second leg fastener disposed in the second leg slot to join the second leg with a base of the gondola projecting away from the gondola upright, whereby the first fastener and the second fastener are selectively repositionable through another of the plurality of first upper slots and another of the plurality of first lower slots to fix a different depth of the first rear edge to the second front edge and thereby accommodate a second shelf depth different from the first shelf depth.

15. A security showcase comprising:

a first side panel defining a plurality of first slots disposed downward from the first upper edge, the plurality of first slots being vertically oriented and parallel to one another and disposed downward from the first upper edge, but transverse to the first upper edge, and oriented parallel to a first front edge and a first rear edge of the first side panel;

a second side panel disposed adjacent the first side panel, the second side panel including a second upper edge, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second slot being selectively alignable with a first slot of the plurality of first slots, at least one of the first side panel and second side panel configured to join with a gondola upright of a gondola;

a first fastener positionable through the first slot and the second slot to fix a first depth of the first rear edge to the second front edge to accommodate a first shelf depth of a first shelf extending from the gondola upright;

a door track; and a transparent closure disposed in the door track so a viewer can view through the transparent closure to the first shelf, the transparent closure comprising a polycarbonate first transparent panel moveably joined with the door track, wherein the first transparent panel is reinforced along a lateral edge with a channel member that extends adjacent the lateral edge, wherein a plurality of panel fasteners extend through a plurality of holes defined through the lateral edge and the channel member to secure the channel member to the lateral edge, whereby the first fastener is selectively repositionable through another of the plurality of first slots to fix a different depth of the first rear edge to the second front edge and thereby accommodate a second shelf depth different from the first shelf depth.

16. A security showcase comprising:

a first side panel defining a plurality of first slots disposed downward from the first upper edge, the plurality of first slots being vertically oriented and parallel to one another and disposed downward from the first upper edge, but transverse to the first upper edge, and oriented parallel to a first front edge and a first rear edge of the first side panel;

a second side panel disposed adjacent the first side panel, the second side panel including a second upper edge, a second lower edge below the second upper edge, a second front edge, a second rear edge rearward of the second front edge, the second side panel being selectively movable such that a distance between the first rear edge and the second rear edge is selectively adjustable in a telescoping manner, the second side panel defining a second slot being selectively alignable with a first slot of the plurality of first slots, at least one of the first side panel and second side panel configured to join with a gondola upright of a gondola;

a first fastener positionable through the first slot and the second slot to fix a first depth of the first rear edge to the second front edge to accommodate a first shelf depth of a first shelf extending from the gondola upright;

a door track including an upwardly opening track channel;

a toe kick joined with the door track and disposed under the upwardly opening track channel, the toe kick including a toe kick lower edge;

a first adjustment support including a first foot, the first adjustment support joined with the toe kick; and a second adjustment support including a second foot, the second adjustment support joined with the toe kick distal from the first adjustment support, wherein the first and second adjustment supports are selectively adjustable to level the toe kick lower edge relative to a horizontal plane, whereby the door track is leveled relative to the horizontal plane, whereby the first fastener is selectively repositionable through another of the plurality of first slots to fix a different depth of the first rear edge to the second front edge and thereby accommodate a second shelf depth different from the first shelf depth.

17. A security case comprising:

a first side panel and an opposing second side panel configured to bound at least a portion of an internal compartment adjacent a gondola;

a top panel joined with the first side panel and the second side panel;

a door track forward of the at least a portion of the internal compartment and spanning between the first side panel and the second side panel;

a toe kick joined with the door track and including a toe kick lower edge;

a first adjustment support including a first foot, the first adjustment support joined with the toe kick;

a second adjustment support including a second foot, the second adjustment support joined with the toe kick distal from the first adjustment support;

a toe kick bracket including a first leg and a second leg transverse to one another, the first leg including a first leg slot, the second leg including a second leg slot;

a first leg fastener disposed in the first leg slot to join the toe kick with the first leg, the first leg fastener and the first leg slot configured to provide a vertical adjustment to the toe kick; and a second leg fastener disposed in the second leg slot to join the second leg with a base of the gondola, the second leg fastener and the second leg slot configured to provide a horizontal adjustment to the toe kick, wherein the top panel includes an upper interior panel and an upper exterior panel telescopingly arranged relative to one another, wherein the first and second adjustment supports are selectively adjustable to level the toe kick lower edge relative to a horizontal plane, whereby the door track is leveled relative to the horizontal plane.

* * * * *